(12) United States Patent
Zheng et al.

(10) Patent No.: US 9,794,597 B2
(45) Date of Patent: Oct. 17, 2017

(54) METHODS AND APPARATUS FOR DEBLOCKING FILTERING OF NON-LOCAL INTRA PREDICTION

(75) Inventors: Yunfei Zheng, San Diego, CA (US); Oscar Divorra Escoda, Barcelona (ES); Peng Yin, Ithaca, NY (US); Joel Sole, La Jolla, CA (US)

(73) Assignee: THOMSON Licensing DTV, Issy-les-Moulineaux (FR)

( * ) Notice: Subject to any disclaimer, the term of this patent is extended or adjusted under 35 U.S.C. 154(b) by 1383 days.

(21) Appl. No.: 12/736,512

(22) PCT Filed: Apr. 9, 2009

(86) PCT No.: PCT/US2009/002236
§ 371 (c)(1),
(2), (4) Date: Mar. 2, 2012

(87) PCT Pub. No.: WO2009/126299
PCT Pub. Date: Oct. 15, 2009

(65) Prior Publication Data
US 2012/0189051 A1    Jul. 26, 2012

Related U.S. Application Data

(60) Provisional application No. 61/044,171, filed on Apr. 11, 2008.

(51) Int. Cl.
*H04N 7/32* (2006.01)
*H04N 19/86* (2014.01)
(Continued)

(52) U.S. Cl.
CPC .......... *H04N 19/86* (2014.11); *H04N 19/117* (2014.11); *H04N 19/157* (2014.11);
(Continued)

(58) Field of Classification Search
CPC .................. H04N 19/00133; H04N 19/86
(Continued)

(56) References Cited

U.S. PATENT DOCUMENTS

2006/0233253 A1* 10/2006 Shi et al. ................ 375/240.16
2006/0268985 A1   11/2006 Liang et al.
(Continued)

FOREIGN PATENT DOCUMENTS

CN    1652610 A    8/2005
EP    1 677 545 A2  7/2006
(Continued)

OTHER PUBLICATIONS

International Preliminary Report on Patentability, 9 pages, PCT, The International Bureau of WIPO, Application No. PCT/US2009/002236, mailed Oct. 12, 2010, found online at European Patent Register on Sep. 15, 2014.*
(Continued)

*Primary Examiner* — Christopher S Kelley
*Assistant Examiner* — Jonathan Messmore
(74) *Attorney, Agent, or Firm* — Brian J. Dorini; Ronald J. Kolczynski

(57) ABSTRACT

Methods and apparatus are provided for deblocking filtering on non-local intra prediction. An apparatus includes an encoder for encoding picture data using non-local intra prediction. The encoder includes a deblocking filter configured for use with non-local intra prediction modes so as to deblock filter at least a portion of the picture data encoded using the non-local intra prediction.

8 Claims, 14 Drawing Sheets

(51) Int. Cl.
*H04N 19/176* (2014.01)
*H04N 19/593* (2014.01)
*H04N 19/117* (2014.01)
*H04N 19/157* (2014.01)
*H04N 19/82* (2014.01)

(52) U.S. Cl.
CPC ......... *H04N 19/176* (2014.11); *H04N 19/593* (2014.11); *H04N 19/82* (2014.11)

(58) Field of Classification Search
USPC .................................................. 375/240.12
See application file for complete search history.

(56) References Cited

U.S. PATENT DOCUMENTS

| | | | |
|---|---|---|---|
| 2008/0117981 A1* | 5/2008 | Lee et al. | 375/240.24 |
| 2009/0116759 A1 | 5/2009 | Suzuki et al. | |
| 2010/0183068 A1* | 7/2010 | Pandit | H04N 19/597 375/240.02 |
| 2012/0320976 A1 | 12/2012 | Suzuki et al. | |

FOREIGN PATENT DOCUMENTS

| | | |
|---|---|---|
| JP | 2006191576 A | 7/2006 |
| JP | 2007043651 A | 2/2007 |
| WO | WO2006073241 A1 | 7/2006 |
| WO | WO2007047786 A2 | 4/2007 |
| WO | WO2007081838 A1 | 7/2007 |
| WO | WO 2008/130367 A1 | 10/2008 |
| WO | WO 2009/089032 A2 | 7/2009 |

OTHER PUBLICATIONS

List et al.: "Adaptive Deblocking Filter", IEEE Transactions on Circuits and Systems for Video Technology, vol. 13, No. 7, Jul. 1, 2003, pp. 614-619.
Balle et al.: "Extended Texture Prediction for H.264/AVC Intra Coding", ICIP 2007, RWTH Aachen University, IEEE, 2007, pp. VI-93-VI-96.
Balle et al: "Extended Texture Prediction for H.264 Intra Coding", ITU-Telecommunications Standardization Sector, Video Coding Experts Group (VCEG), Document: VCEG-AE11, 31st Meeting: Marrakech, MA, Jan. 15, 2007, pp. 1-7.
Tan et al.: "Intra Prediction by Template Matching", ICIP, 2006, IEEE, 2006, pp. 1693-1696.
Yin et al.: "Localized Weighted Prediction for Video Coding", Thomson Corporate Research, IEEE, 2005, pp. 4365-4368.
Park et al.: "MVC Deblocking for Illumination Compensation", Joint Video Team (JVT) of ISO/IEC MPEG & ITU-T VCEG, Document: JVT-V033, 22nd Meeting: Marrakech, Morocco, Jan. 13-19, 2007, 22 pages
Zheng et al.: "Intra Prediction Using Template Matching with Adaptive Illumination Compensation", 15th IEEE Int'l. Conference on Image Processing, 2008 (ICIP 2008), Oct. 12, 2008, pp. 125-128.
Yu et al.: "New Intra Prediction using Intra-Macroblock Motion Compensation", Joint Video Team (JVT) of ISO/IEC MPEG & ITU-T VCEG, Document: JVT-C151, May 6, 2002.

* cited by examiner

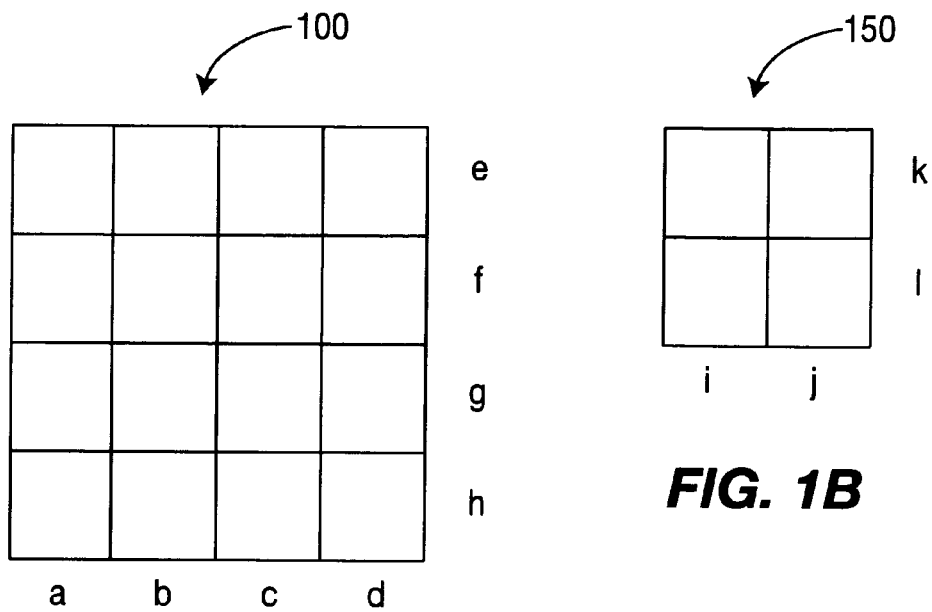
FIG. 1A
FIG. 1B
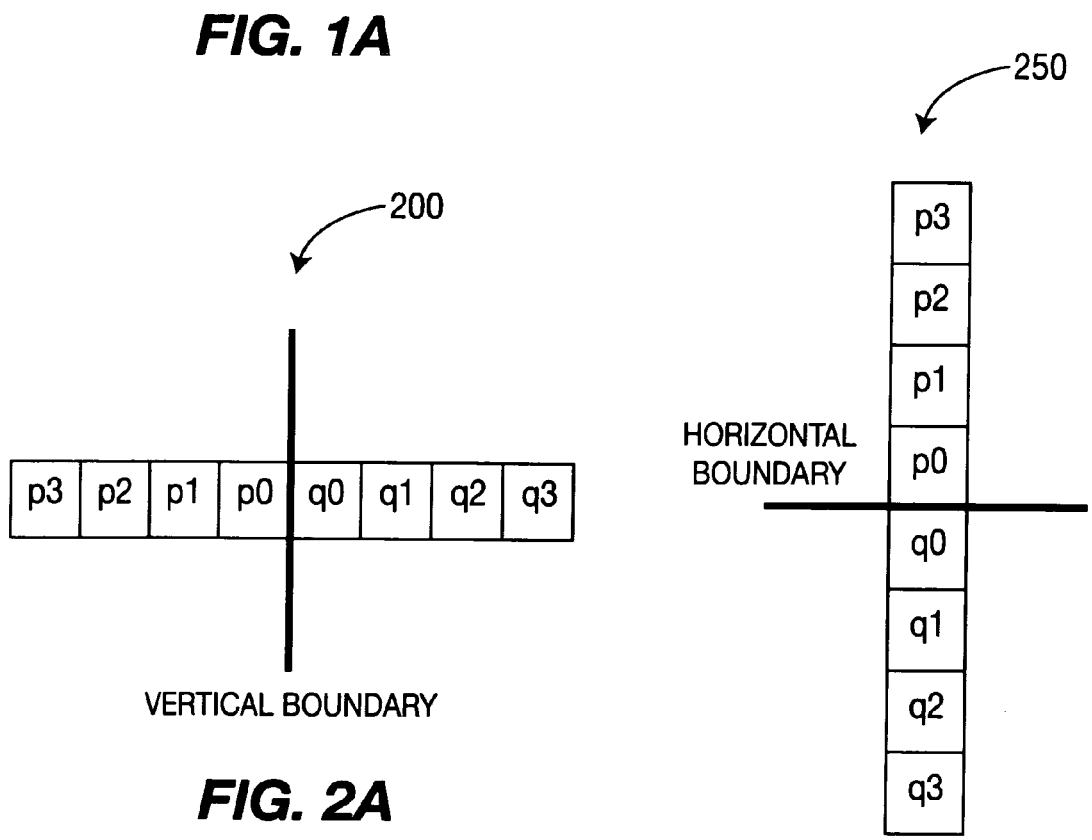
FIG. 2A
FIG. 2B

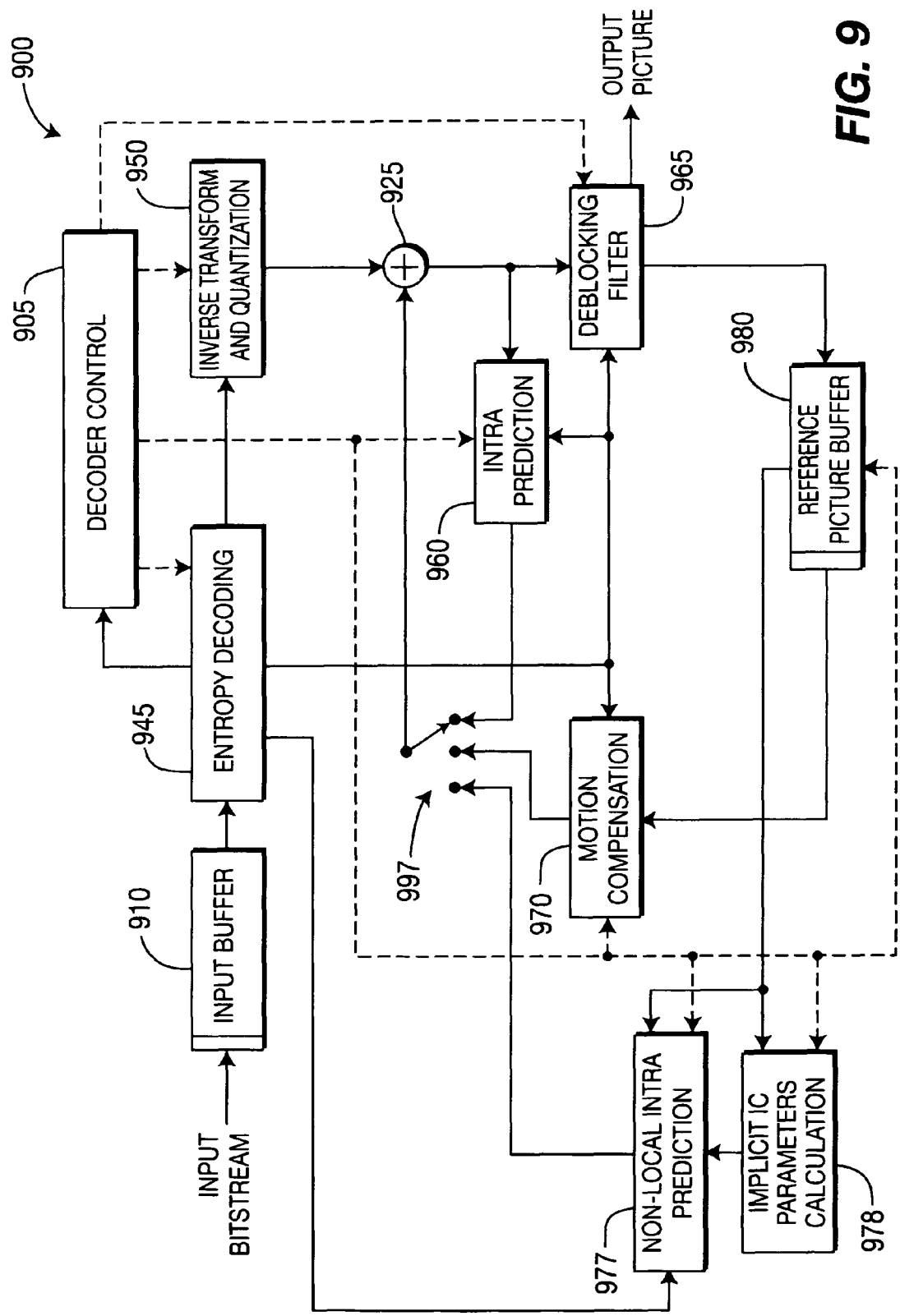

METHODS AND APPARATUS FOR DEBLOCKING FILTERING OF NON-LOCAL INTRA PREDICTION

CROSS-REFERENCE TO RELATED APPLICATIONS

This application claims the benefit, under 35 U.S.C. §365 of International Application PCT/US2009/002236, filed Apr. 9, 2009, which was published in accordance with PCT Article 21(2) on Oct. 15, 2009 in English and which claims the benefit of U.S. provisional patent application No. 61/044,171, filed Apr. 11, 2008.

TECHNICAL FIELD

The present principles relate generally to video encoding and decoding and, more particularly, to methods and apparatus for deblocking filtering of non-local intra prediction.

BACKGROUND

In a block-based predictive video coding model, an image block can be coded by generating a prediction, subtracting the prediction from the image block to generate the residue, transforming the residue, and quantizing the transformed residue, and finally transmitting the quantized residue coefficients. Since the quantization process can cause information loss, visible blocking artifacts may often be produced between adjacent coding blocks. In particular, the smooth region and the edge between adjacent coding blocks may appear discontinuous, which is highly undesirable.

In order to remove or reduce such artifacts, some filtering can be performed in order to smooth the transition between adjacent coding blocks which are likely to present some blocking artifacts. The filtering strength on block boundaries often depends on the prediction modes used in each coding block, since correlations exist between the coding modes used and the blocking artifact perceived at a given bitrate. In intra prediction, most of the current video encoding techniques (e.g., intra prediction in accordance with the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard")) exploit local neighboring information to generate the prediction of the current block. Therefore, current deblocking filtering methods for intra predicted blocks are designed based on the knowledge of local information.

Recently, some non-local intra prediction approaches have been introduced and have achieved good coding efficiency. One such example includes displacement intra prediction (DIP). Another such example includes template matching prediction (TMP). These approaches try to exploit a region's self-similarity existing within the picture. Specifically, non-local intra prediction techniques can use non-local information within the decoded portion of the encoding picture to generate the prediction, which is different from the local intra prediction techniques (e.g., intra prediction in accordance with the MPEG-4 AVC Standard) that exploit only the local neighboring data. When such non-local prediction techniques are introduced in intra prediction, deblocking filtering methods and strategies designed so far may fail in properly filtering out blocky artifacts. Indeed, the filtering strategy defined for local intra prediction should be modified for more efficient deblocking filtering of other prediction approaches such as non-local prediction.

In the MPEG-4 AVC Standard, a filter is applied to each decoded macroblock in order to reduce blocking artifacts. The deblocking filter is applied on reconstructed picture data in both the encoder and decoder. The filter smoothes block transitions, improving the appearance of decoded frames. Filtering is applied to vertical or horizontal edges of 4×4 blocks in a macroblock (except for edges on the slice boundaries). The default deblocking filtering order is to filter edges in the luma component first, and then to filter edges in the chroma components. In each component, vertical edges are filtered before horizontal edges. Turning to FIGS. 1A and 1B, a 16×16 luma component of a macroblock and a 8×8 chroma component of the macroblock are indicated generally by the reference numerals 100 and 150, respectively. The edge filtering order in the macroblock is as follows: a; b; c; d; e; f; g; h; i; j; k; and l. Each filtering operation affects up to three samples on either side of the boundary. Turning to FIGS. 2A and 2B, samples adjacent to vertical and horizontal boundaries are indicated generally by the reference numerals 200 and 250, respectively. In particular, four samples are shown on either side of a vertical or horizontal boundary in adjacent blocks p and q (p0, p1, p2, p3 and q0, q1, q2, q3, respectively). In the MPEG-4 AVC Standard, the filter used for deblocking in a particular location depends on the boundary strength (BS), the gradient of image samples across the boundary, and the current quantization strength.

Turning to FIG. 3, an exemplary method for selecting a deblocking filtering boundary strength (bS) with respect to the MPEG-4 AVC Standard is indicated generally by the reference numeral 300. The method 300 includes a start block 305 that passes control to a function block 310. The function block 310 inputs p and q blocks and intra prediction modes, and passes control to a decision block 315. The decision block 315 determines whether the block p or the block q is intra coded. If so, then control is passed to a decision block 320. Otherwise, control is passed to a decision block 335.

The decision block 320 determines whether or not the block boundary is a macroblock boundary. If so, then control is passed to a function block 325. Otherwise, control is passed to a function block 330.

The function block 325 sets the boundary strength (bS) equal to four, and passes control to a function block 365.

The function block 365 outputs the boundary strength (bS), and passes control to an end block 399.

The function block 330 sets the boundary strength (bS) equal to three, and passes control to the function block 365.

The decision block 335 determines whether or not there is a coefficient coded in block p or block q. If so, then control is passed to a function block 340. Otherwise, control is passed to a decision block 345.

The function block 340 sets the boundary strength (bS) equal to two, and passes control to the function block 365.

The decision block 345 determines whether or not the block p and the block q have a different reference frame number of a different number of reference frames. If so, then control is passed to a function block 350. Otherwise, control is passed to a decision block 355.

The function block 350 sets the boundary strength (bS) equal to one, and passes control to the function block 365.

The decision block 355 determines whether or not the difference of the motion vectors of the pixels in two boundary sides is larger than one. If so, then control is passed to the function block 350. Otherwise, control is passed to a function block 360.

The function block 360 sets the boundary strength (bS) equal to zero, and passes control to the function block 365.

Hence, the boundary strength parameter (BS) is chosen according to the rules illustrated in FIG. 3. The result of applying these rules is that the filtering strength depends on the encoded data such that it is stronger at places where there is likely to be significant blocky artifacts (e.g., the boundary of an intra coded macroblock or a boundary between blocks that include coded coefficients). Based on the selection of boundary strength, the final filtering process is determined by the quantization parameter and the gradient of image samples across the boundary.

In FIG. 3, we can see that the MPEG-4 AVC Standard uses a higher boundary strength value for intra coded blocks, since the local intra prediction techniques used by the MPEG-4 AVC Standard use very simple models. However, these very simply models are unable to predict the whole set of components of the signal, resulting in more residue information for subsequent coding. The more prediction residue that is left for coding, the higher the probability of information loss during quantization which, in turn, may cause more blocky artifacts around the block boundary. However, if more advanced intra prediction approaches are introduced, such as non-local intra prediction techniques, the existing deblocking scheme is no longer suitable for those blocks.

Non-Local Intra Prediction

Non-local intra prediction accounts for those techniques that can exploit non-local information within the encoded picture in order to generate a prediction of the current coding block or region. Non-local information includes decoded data available at both the encoder and decoder. We can classify the non-local intra prediction techniques into forward prediction and backward prediction techniques based on the necessity of overhead transmitted. Displaced intra prediction and template matching prediction are typical forward and backward non-local intra prediction techniques, respectively.

Displaced Intra Prediction (DIP)

Motivated by inter motion compensation, displaced intra prediction reuses block patches in the reconstructed decoded area of a picture in order to predict the current block. Displaced intra prediction looks for the most similar block to the current block to be encoded within the reconstructed area of the picture that includes the current block. An intra displacement vector per block or partition is thus sent to the decoder as overhead. Turning to FIG. 4, an example of displaced intra prediction (DIP) is indicated generally by the reference numeral 400. The displaced intra prediction 400 involves a region to be encoded 410, a current block 411 to be encoded that is located within the region 410, a reconstructed region 430 located in the same picture as the patch 410, a candidate block 431 in the reconstructed region 410, and an intra displacement vector 440. Displaced intra prediction is very suitable for coding pictures with a lot of repetitive texture or structure patterns.

Template Matching Prediction (TMP)

Turning to FIG. 5, an example of template matching prediction (TMP) is indicated generally by the reference numeral 500. The template matching prediction 500 involves a region to be encoded 510, a current template 511 including a current block 512 to be encoded, a reconstructed region 530 in the same picture as the patch 510, a candidate template 533 within the reconstructed region 530, and a candidate block 531 within the candidate template 533.

As shown in FIG. 5, template matching prediction also generates predictions by reusing available reconstructed data at the encoder or decoder. Unlike displaced intra prediction, template matching prediction uses backward-adaptive texture synthesis techniques, requiring no overhead to be sent. Template matching prediction measures the similarity between the surrounding neighboring pixels (available at both the encoder and decoder) and candidate template for prediction rather than the original block data as used in displaced intra prediction. Since no additional overhead is required by template matching prediction, the target block can be partitioned into smaller blocks for prediction. This allows for more accurate modeling of high frequency components and complicated structures, reducing the residue to be coded. Template matching imposes a certain smoothness on the predicted block with respect to the neighboring blocks that have been used for the matching reference. This imposes some continuity in the prediction, which reduces the blocking effect due to prediction.

Non-Local Infra Prediction with IC

The previously described non-local intra prediction techniques typically use the Sum of Absolute Differences (SAD) or Sum Squared Errors (SSE) to measure the similarity between two templates (in template matching prediction) or two blocks (in displaced intra prediction). Although such measurement works well in most cases, it is not efficient enough when there is some mismatch between the templates or blocks. This may happen in the presence of illumination disparities or geometric variations, leading to sub-optimal prediction synthesis and a larger residue. This is due to the fact that non-local prediction techniques cannot always capture the local features of an image, such as contrast and brightness. Various adaptive illumination compensation (IC) approaches have been proposed to solve this problem explicitly or implicitly. Introducing illumination compensation to intra prediction results in further improvement in the prediction efficiency, which leads to a smaller amount of residue coefficients to be coded compared to the case without illumination compensation.

Non-local prediction techniques are able to provide better intra prediction. This reduces the amount of residue and, consequently, the probability of having blocking artifacts. Hence, the different nature of these prediction techniques requires the use of an adapted deblocking procedure.

SUMMARY

These and other drawbacks and disadvantages of the prior art are addressed by the present principles, which are directed to methods and apparatus for deblocking filtering of non-local intra prediction.

According to an aspect of the present principles, there is provided an apparatus. The apparatus includes an encoder for encoding picture data using non-local intra prediction. The encoder includes a deblocking filter configured for use with non-local intra prediction modes so as to deblock filter at least a portion of the picture data encoded using the non-local intra prediction.

According to another aspect of the present principles, there is provided a method. The method includes encoding picture data using non-local intra prediction. The encoding step includes performing deblocking filtering configured for use with non-local intra prediction modes so as to deblock filter at least a portion of the picture data encoded using the non-local intra prediction.

According to still another aspect of the present principles, there is provided an apparatus. The apparatus includes a decoder for decoding picture data using non-local intra prediction. The decoder includes a deblocking filter configured for use with non-local intra prediction modes so as to deblock filter at least a portion of the picture data decoded using the non-local intra prediction.

According to a further aspect of the present principles, there is provided a method. The method includes decoding picture data using non-local intra prediction. The decoding step includes performing deblocking filtering configured for use with non-local intra prediction modes so as to deblock filter at least a portion of the picture data decoded using the non-local intra prediction.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIGS. 1A and 1B are block diagram respectively showing a 16×16 luma component of a macroblock and a 8×8 chroma component of the macroblock, to which the present principles may be applied;

FIGS. 2A and 2B are block diagrams respectively showing samples adjacent to vertical and horizontal boundaries, to which the present principles may be applied;

FIG. 9 is a block diagram showing an exemplary MPEG-4 AVC Standard based video decoder with non-local intra prediction and illumination compensation, in accordance with an embodiment of the present principles;

DETAILED DESCRIPTION

Figure 3:
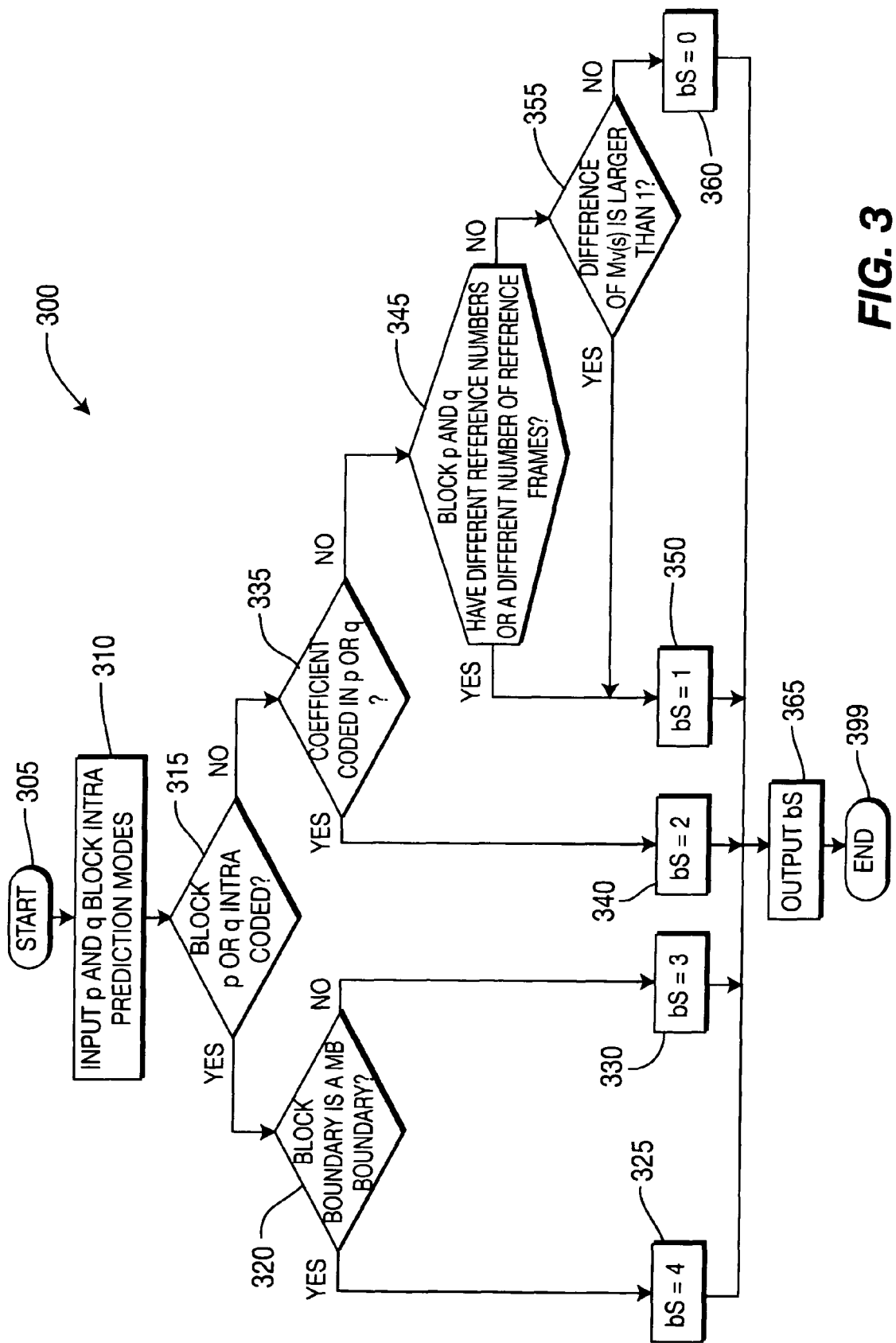
FIG. 3 is a flow diagram showing an exemplary method for selecting a deblocking filtering boundary strength (bS) with respect to the MPEG-4 AVC Standard.

The present principles are directed to methods and apparatus for deblocking filtering of non-local intra prediction.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof.

Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Further, it is to be appreciated that while embodiments of the present principles are described with respect to intra prediction techniques such as displaced intra prediction and template matching prediction, the present principles are not limited solely to the preceding types of intra prediction techniques and, thus, other intra prediction techniques may also be used in accordance with the teachings of the present principles, while maintaining the spirit of the present principles.

Also, it is to be appreciated that the present principles may be applied to non-local intra prediction techniques that use illumination compensation, while maintaining the spirit of the present principles.

Additionally, it is to be appreciated that the preceding and other techniques to which the present principles may be applied are readily determined by one of ordinary skill in this and related arts given the teachings of the present principles provided herein, while maintaining the spirit of the present principles.

Displaced intra prediction and template matching prediction are exemplary non-local prediction approaches used herein for illustrative purposes. Thus, it is to be appreciated that the present principles are not limited to solely the preceding types of intra prediction techniques and can be used with respect to other non-local prediction techniques, while maintaining the spirit of the present principles. Moreover, the present principles may also be applied to non-local prediction techniques where illumination compensation is involved, while maintaining the spirit of the present principles.

Figure 6:
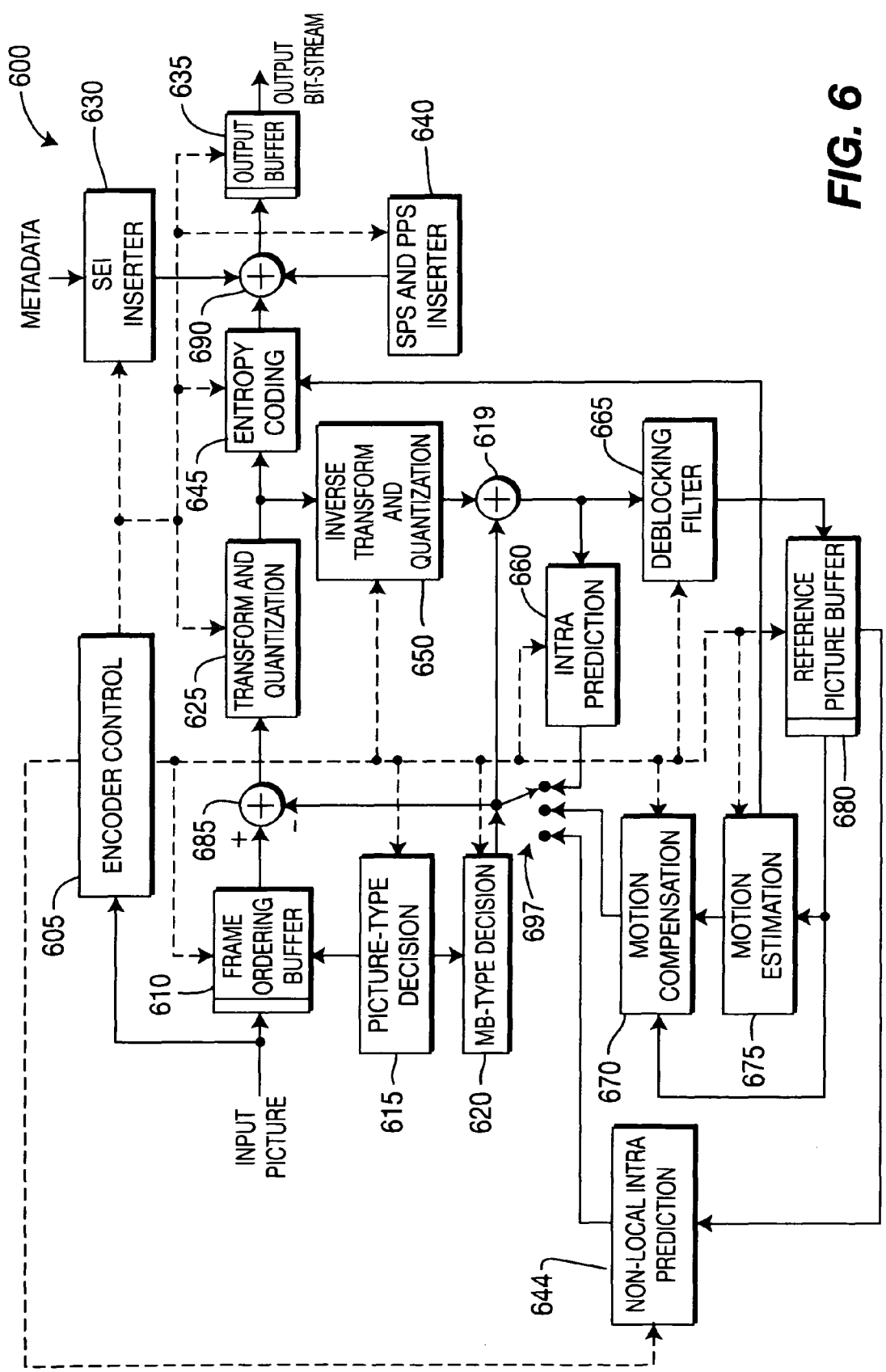
FIG. 6 is a block diagram showing an exemplary MPEG-4 AVC Standard based video encoder with non-local intra prediction, in accordance with an embodiment of the present principles.

Turning to FIG. 6, an exemplary MPEG-4 AVC Standard based video encoder with non-local intra prediction is indicated generally by the reference numeral 600.

The video encoder 600 includes a frame ordering buffer 610 having an output in signal communication with a non-inverting input of a combiner 685. An output of the combiner 685 is connected in signal communication with a first input of a transformer and quantizer 625. An output of the transformer and quantizer 625 is connected in signal communication with a first input of an entropy coder 645 and a first input of an inverse transformer and inverse quantizer 650. An output of the entropy coder 645 is connected in signal communication with a first non-inverting input of a combiner 690. An output of the combiner 690 is connected in signal communication with a first input of an output buffer 635.

A first output of an encoder controller 605 is connected in signal communication with a second input of the frame ordering buffer 610, a second input of the inverse transformer and inverse quantizer 650, an input of a picture-type decision module 615, a first input of a macroblock-type (MB-type) decision module 620, a second input of an intra prediction module 660, a second input of a deblocking filter 665, a first input of a motion compensator 670, a first input of a motion estimator 675, and a second input of a reference picture buffer 680.

A second output of the encoder controller 605 is connected in signal communication with a first input of a Supplemental Enhancement Information (SEI) inserter 630, a second input of the transformer and quantizer 625, a second input of the entropy coder 645, a second input of the output buffer 635, and an input of the Sequence Parameter Set (SPS) and Picture Parameter Set (PPS) inserter 640.

A third output of the encoder controller 605 is connected in signal communication with a first input of a non-local intra predictor 644.

An output of the SEI inserter 630 is connected in signal communication with a second non-inverting input of the combiner 690.

A first output of the picture-type decision module 615 is connected in signal communication with a third input of a frame ordering buffer 610. A second output of the picture-type decision module 615 is connected in signal communication with a second input of a macroblock-type decision module 620.

An output of the Sequence Parameter Set (SPS) and Picture Parameter Set (PPS) inserter 640 is connected in signal communication with a third non-inverting input of the combiner 690.

An output of the inverse quantizer and inverse transformer 650 is connected in signal communication with a first non-inverting input of a combiner 619. An output of the combiner 619 is connected in signal communication with a first input of the intra prediction module 660 and a first input of the deblocking filter 665. An output of the deblocking filter 665 is connected in signal communication with a first input of a reference picture buffer 680. A first output of the reference picture buffer 680 is connected in signal communication with a second input of the motion estimator 675 and a third input of the motion compensator 670. A second output of the reference picture buffer 680 is connected in signal communication with a second input of the non-local intra predictor 644. A first output of the motion estimator 675 is connected in signal communication with a second input of the motion compensator 370. A second output of the motion estimator 675 is connected in signal communication with a third input of the entropy coder 645.

An output of the motion compensator 670 is connected in signal communication with a first input of a switch 697. An output of the intra prediction module 660 is connected in signal communication with a second input of the switch 697. An output of the non-local intra predictor 644 is connected in signal communication with a third input of the switch 697. An output of the macroblock-type decision module 620 is connected in signal communication with a fourth input of the switch 697. The fourth input of the switch 697 determines whether or not the "data" input of the switch (as compared to the control input, i.e., the fourth input) is to be provided by the motion compensator 670 or the intra prediction module 660 or the non-local intra predictor 644. The output of the switch 697 is connected in signal communication with a second non-inverting input of the combiner 619 and an inverting input of the combiner 685.

A first input of the frame ordering buffer 610 and an input of the encoder controller 605 are available as input of the encoder 600, for receiving an input picture. Moreover, a second input of the Supplemental Enhancement Information (SEI) inserter 630 is available as an input of the encoder 600, for receiving metadata. An output of the output buffer 635 is available as an output of the encoder 600, for outputting a bitstream.

Figure 7:
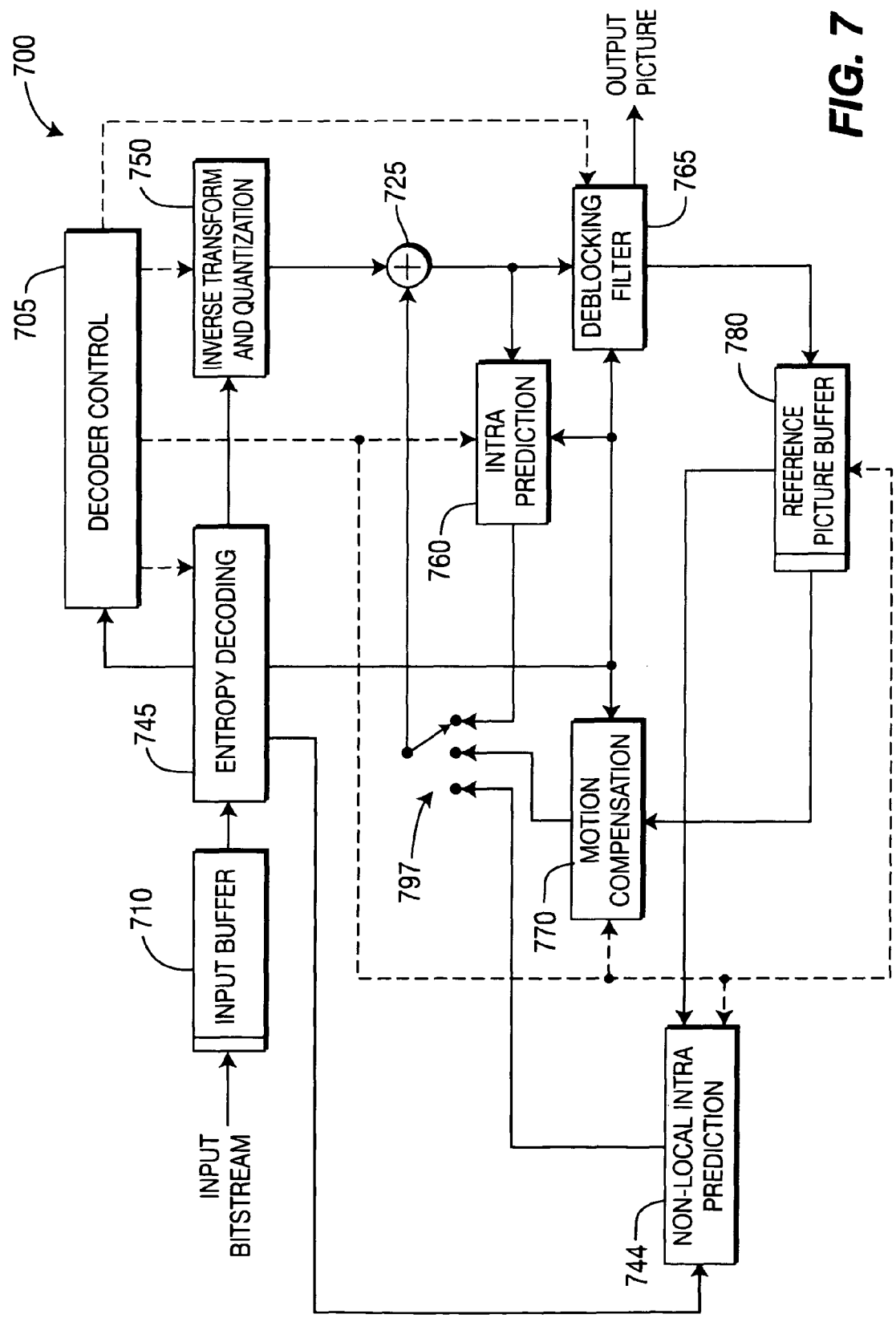
FIG. 7 is a block diagram showing an exemplary MPEG-4 AVC Standard based video decoder with non-local intra prediction, in accordance with an embodiment of the present principles.

Turning to FIG. 7, an exemplary MPEG-4 AVC Standard based video decoder with non-local intra prediction is indicated generally by the reference numeral 700.

The video decoder 700 includes an input buffer 710 having an output connected in signal communication with a first input of the entropy decoder 745. A first output of the entropy decoder 745 is connected in signal communication with a first input of an inverse transformer and inverse quantizer 750. An output of the inverse transformer and inverse quantizer 750 is connected in signal communication with a second non-inverting input of a combiner 725. An output of the combiner 725 is connected in signal communication with a second input of a deblocking filter 765 and a first input of an intra prediction module 760. A second output of the deblocking filter 765 is connected in signal communication with a first input of a reference picture buffer 780. A first output of the reference picture buffer 780 is connected in signal communication with a second input of a motion compensator 770. A second output of the reference picture buffer 780 is connected in signal communication with a second input of a non-local intra predictor 744.

A second output of the entropy decoder 745 is connected in signal communication with a third input of the motion compensator 770 and a first input of the deblocking filter 765. A third output of the entropy decoder 745 is connected in signal communication with an input of a decoder controller 705. A fourth output of the entropy decoder 745 is connected in signal communication with a first input of the non-local intra predictor 744. A first output of the decoder controller 705 is connected in signal communication with a second input of the entropy decoder 745. A second output of the decoder controller 705 is connected in signal communication with a second input of the inverse transformer and inverse quantizer 750. A third output of the decoder controller 705 is connected in signal communication with a third input of the deblocking filter 765. A fourth output of the decoder controller 705 is connected in signal communication with a second input of the intra prediction module 760, a first input of the motion compensator 770, a second input of the reference picture buffer 780, and a third input of the non-local intra predictor 744.

An output of the motion compensator 770 is connected in signal communication with a first input of a switch 797. An output of the intra prediction module 760 is connected in signal communication with a second input of the switch 797. An output of the non-local intra predictor 744 is connected in signal communication with a third input of the switch 797. An output of the switch 797 is connected in signal communication with a first non-inverting input of the combiner 725.

An input of the input buffer 710 is available as an input of the decoder 700, for receiving an input bitstream. A first output of the deblocking filter 765 is available as an output of the decoder 700, for outputting an output picture.

Figure 8:
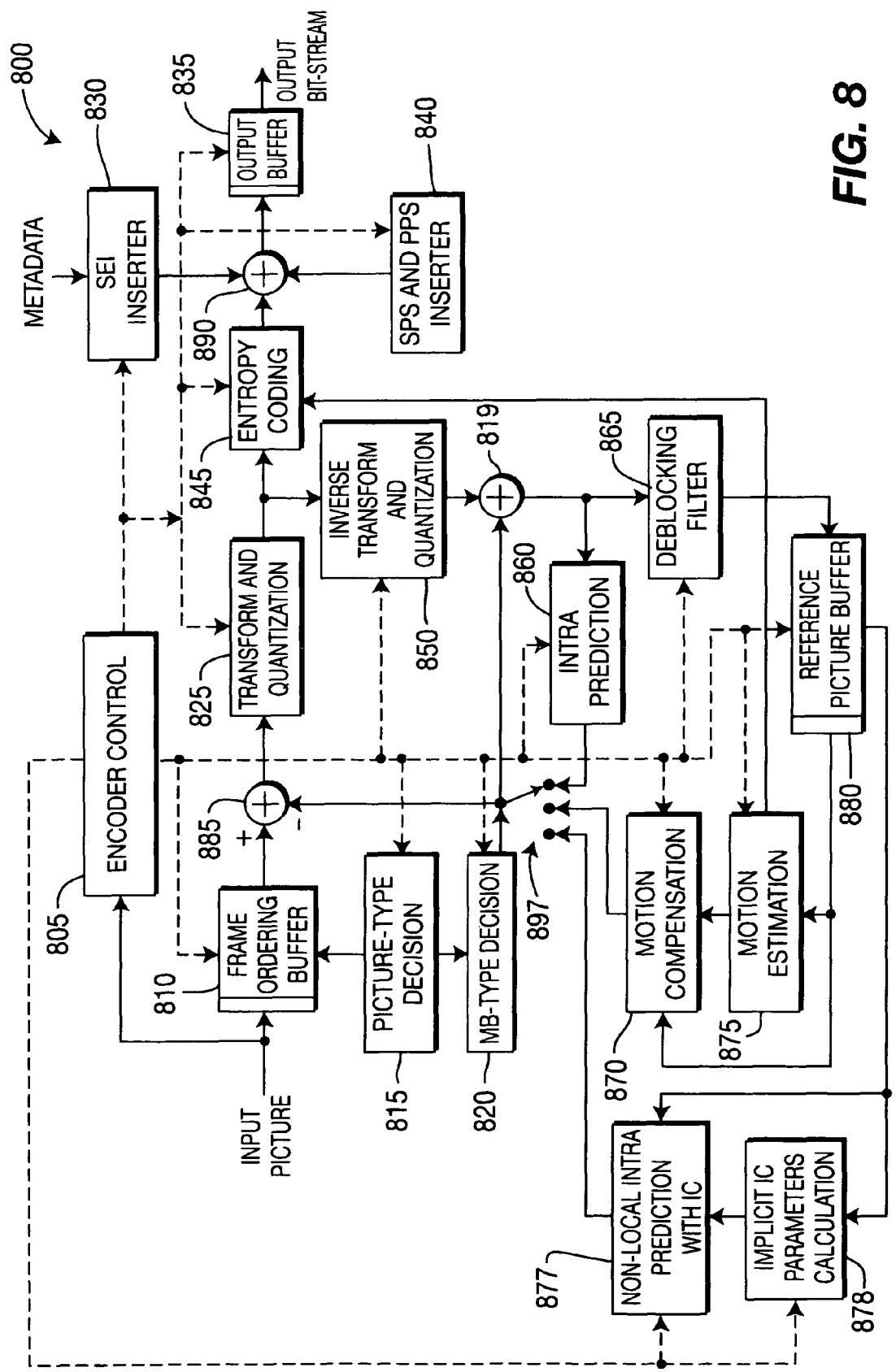
FIG. 8 is a block diagram showing an exemplary MPEG-4 AVC Standard based video encoder with non-local intra prediction and illumination compensation, in accordance with an embodiment of the present principles.

Turning to FIG. 8, an exemplary MPEG-4 AVC Standard based video encoder with non-local intra prediction and illumination compensation is indicated generally by the reference numeral 800.

The video encoder 800 includes a frame ordering buffer 810 having an output in signal communication with a non-inverting input of a combiner 885. An output of the combiner 885 is connected in signal communication with a first input of a transformer and quantizer 825. An output of the transformer and quantizer 825 is connected in signal communication with a first input of an entropy coder 845 and a first input of an inverse transformer and inverse quantizer 850. An output of the entropy coder 845 is connected in signal communication with a first non-inverting input of a combiner 890. An output of the combiner 890 is connected in signal communication with a first input of an output buffer 835.

A first output of an encoder controller 805 is connected in signal communication with a second input of the frame ordering buffer 810, a second input of the inverse transformer and inverse quantizer 850, an input of a picture-type decision module 815, a first input of a macroblock-type (MB-type) decision module 820, a second input of an intra prediction module 860, a second input of a deblocking filter 865, a first input of a motion compensator 870, a first input of a motion estimator 875, and a second input of a reference picture buffer 880.

A second output of the encoder controller 805 is connected in signal communication with a first input of a Supplemental Enhancement Information (SEI) inserter 830, a second input of the transformer and quantizer 825, a second input of the entropy coder 845, a second input of the output buffer 835, and an input of the Sequence Parameter Set (SPS) and Picture Parameter Set (PPS) inserter 840.

A third output of the encoder controller 805 is connected in signal communication with a first input of a non-local intra predictor with illumination compensation 877 and a first input of an implicit illumination compensation parameters calculator 878.

An output of the SEI inserter 830 is connected in signal communication with a second non-inverting input of the combiner 890.

A first output of the picture-type decision module 815 is connected in signal communication with a third input of a frame ordering buffer 810. A second output of the picture-type decision module 815 is connected in signal communication with a second input of a macroblock-type decision module 820.

An output of the Sequence Parameter Set (SPS) and Picture Parameter Set (PPS) inserter 840 is connected in signal communication with a third non-inverting input of the combiner 890.

An output of the implicit illumination compensation parameters calculator 878 is connected in signal communication with a third input of the non-local intra predictor with illumination compensation 877.

An output of the inverse quantizer and inverse transformer 850 is connected in signal communication with a first non-inverting input of a combiner 819. An output of the combiner 819 is connected in signal communication with a first input of the intra prediction module 860 and a first input of the deblocking filter 865. An output of the deblocking filter 865 is connected in signal communication with a first input of a reference picture buffer 880. A first output of the reference picture buffer 880 is connected in signal communication with a second input of the motion estimator 875 and a third input of the motion compensator 870. A second output of the reference picture buffer 880 is connected in signal communication with a second input of the non-local intra predictor with illumination compensation 877 and a second input of the implicit illumination compensation parameters calculator 878. A first output of the motion estimator 875 is connected in signal communication with a second input of the motion compensator 870. A second output of the motion estimator 875 is connected in signal communication with a third input of the entropy coder 845.

An output of the motion compensator 870 is connected in signal communication with a first input of a switch 897. An output of the intra prediction module 360 is connected in signal communication with a second input of the switch 897. An output of the non-local intra predictor with illumination compensation 877 is connected in signal communication with a third input of the switch 897. An output of the macroblock-type decision module 820 is connected in signal communication with a fourth input of the switch 897. The fourth input of the switch 897 determines whether or not the "data" input of the switch (as compared to the control input, i.e., the fourth input) is to be provided by the motion compensator 870 or the intra prediction module 860 or the non-local intra predictor with illumination compensation 877. The output of the switch 897 is connected in signal communication with a second non-inverting input of the combiner 819 and an inverting input of the combiner 885.

A first input of the frame ordering buffer 810 and an input of the encoder controller 805 are available as input of the encoder 800, for receiving an input picture. Moreover, a second input of the Supplemental Enhancement Information (SEI) inserter 830 is available as an input of the encoder 800, for receiving metadata. An output of the output buffer 835 is available as an output of the encoder 800, for outputting a bitstream.

Turning to FIG. 9, an exemplary MPEG-4 AVC Standard based video decoder with non-local intra prediction and illumination compensation is indicated generally by the reference numeral 900.

The video decoder 900 includes an input buffer 910 having an output connected in signal communication with a first input of the entropy decoder 945. A first output of the entropy decoder 945 is connected in signal communication with a first input of an inverse transformer and inverse quantizer 950. An output of the inverse transformer and inverse quantizer 950 is connected in signal communication with a second non-inverting input of a combiner 925. An output of the combiner 925 is connected in signal communication with a second input of a deblocking filter 965 and a first input of an intra prediction module 960. A second output of the deblocking filter 965 is connected in signal communication with a first input of a reference picture buffer 980. A first output of the reference picture buffer 980 is connected in signal communication with a second input of a motion compensator 970. A second output of the reference picture buffer 980 is connected in signal communication with a second input of a non-local intra predictor with illumination compensation 977, and a second input of an implicit illumination compensation parameters calculator 978. An output of the implicit illumination compensation parameters calculator 978 is connected in signal communication with a third input of the non-local intra predictor 977.

A second output of the entropy decoder 945 is connected in signal communication with a third input of the motion compensator 970, and a first input of the deblocking filter 965. A third output of the entropy decoder 945 is connected in signal communication with an input of a decoder controller 905. A first output of the decoder controller 905 is connected in signal communication with a second input of the entropy decoder 945. A second output of the decoder controller 905 is connected in signal communication with a second input of the inverse transformer and inverse quantizer 950. A third output of the decoder controller 905 is connected in signal communication with a third input of the deblocking filter 965. A fourth output of the decoder controller 905 is connected in signal communication with a second input of the intra prediction module 960, a first input of the motion compensator 970, a second input of the reference picture buffer 980, a first input of the non-local intra predictor with illumination compensation 977, and a first input of the implicit illumination compensation parameters calculator 978.

An output of the motion compensator 970 is connected in signal communication with a first input of a switch 997. An output of the intra prediction module 960 is connected in signal communication with a second input of the switch 997. An output of the non-local intra predictor with illumination compensation is connected in signal communication with a third input of the switch 997. An output of the switch 997 is connected in signal communication with a first non-inverting input of the combiner 925.

An input of the input buffer 910 is available as an input of the decoder 900, for receiving an input bitstream. A first output of the deblocking filter 965 is available as an output of the decoder 900, for outputting an output picture.

As noted above, the present principles are directed to methods and apparatus for deblocking filtering of non-local intra prediction.

In accordance with the present principles, we describe a technique for deblocking filtering that is optimized for use with non-local intra prediction techniques. Advantageously, the present principles are capable of suppressing blocking artifacts introduced in a video encoder and/or decoder when using non-local intra prediction in image and/or video (hereinafter collectively referred to as "image") compression. In particular, the present principles provide exemplary schemes for adaptively determining the boundary strength for deblocking filtering block boundaries when non-local intra prediction techniques are involved in the prediction. Moreover, the present principles also provide exemplary schemes for adaptively determining the boundary strength for deblocking filtering block boundaries according to illumination compensation parameters when illumination compensation is enabled for use in combination with non-local intra prediction.

According to an embodiment, one or more of deblocking filter strength, filter type, and filter length are adapted depending on one or more of a scanning order of picture data, coding mode information or other coding parameters and illumination compensation parameters of adjacent picture data regions. In an embodiment, a new deblocking filtering boundary strength determination scheme is introduced in order to properly handle region transition between the differently predicted picture areas and where non-local prediction is involved. Displaced intra prediction and template matching prediction are exemplary non-local prediction approaches used herein for illustrative purposes. Thus, it is to be appreciated that, as noted above, the present principles are not limited to solely the preceding types of intra prediction techniques and can be used with respect to other non-local prediction techniques, while maintaining the spirit of the present principles. Moreover, as noted above, the present principles may also be applied to non-local prediction techniques where illumination compensation is involved, while maintaining the spirit of the present principles.

Deblocking Filter Adaptation for Non-Local Intra Prediction

In an embodiment, the boundary strength determination also takes into account the non-local prediction type information in intra coding. In an embodiment, a suitable boundary strength is set based on the capabilities of non-local prediction techniques to keep a particular boundary smooth. For example, we can apply smaller boundary strength to boundaries that are formed by blocks coded by non-local prediction techniques (e.g., template matching prediction and displaced intra prediction). Since template matching prediction can better maintain smoothness across boundaries than displaced intra prediction, a smaller filtering boundary strength is set.

Deblocking Filter Adaptation for Non-Local Intra Prediction with Illumination Compensation (IC)

When illumination compensation is involved in non-local intra prediction, the boundary strength decision should be able to take the compensated illumination variation into account. This is due to the fact that illumination compensation is conducted without a block boundary smoothness constraint. In an embodiment, we take the illumination compensation parameters into account for determining the boundary strength. In an embodiment, the higher boundary strength is applied to a given boundary currently being evaluated when the difference of the illumination compensation parameters of the corresponding blocks are larger (for example, than a predetermined threshold, such that the large difference of illumination parameters at two sides of a boundary has a high probability of causing visible artifacts). In an embodiment, the illumination compensation for a block is conducted by multiplying a contrast parameter a and adding an offset parameter b to an uncompensated block.

Figure 4:
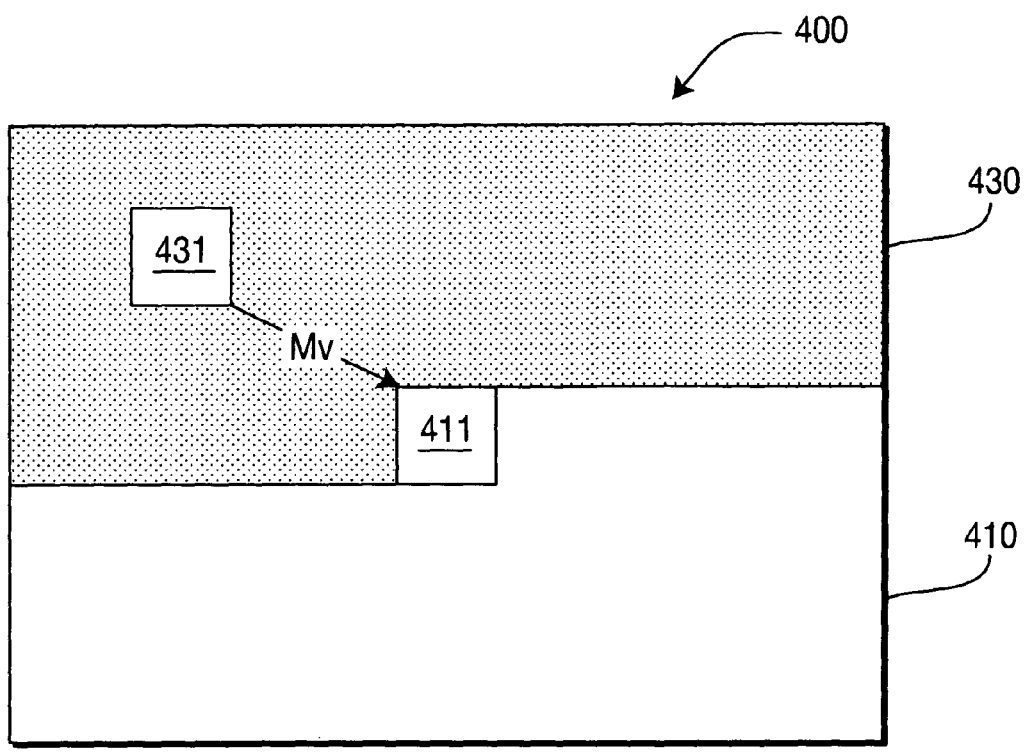
FIG. 4 is a block diagram showing an example of displaced intra prediction (DIP), to which the present principles may be applied.
Figure 5:
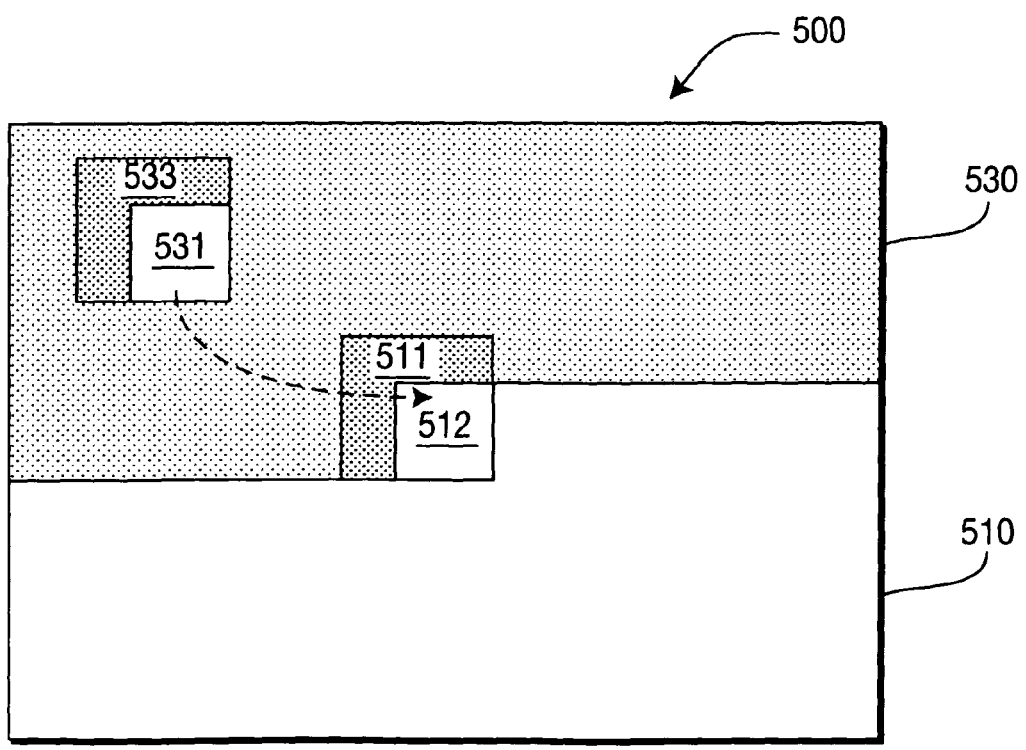
FIG. 5 is a block diagram showing an example of template matching prediction (TMP), to which the present principles may be applied.

The two parameters can be adaptively calculated using the causal neighboring pixels (e.g., from the reconstructed region 420 shown in FIG. 4). In one special case, we set a=1, so we only use b to make the boundary strength decision.

Herein, we describe two exemplary embodiments on how to alter the deblocking filtering boundary strength for non-local intra prediction techniques. The same methodology can be applied to the filter type and filter length. For illustrative purposes, we use the MPEG-4 AVC Standard to describe one or more embodiments of the present principles. However, as noted above, the present principles are not limited to solely the MPEG-4 AVC Standard. The first embodiment is directed to the case where non-local intra prediction is involved. The second embodiment is directed to the case where non-local intra prediction and illumination compensation are involved.

Figure 10A:
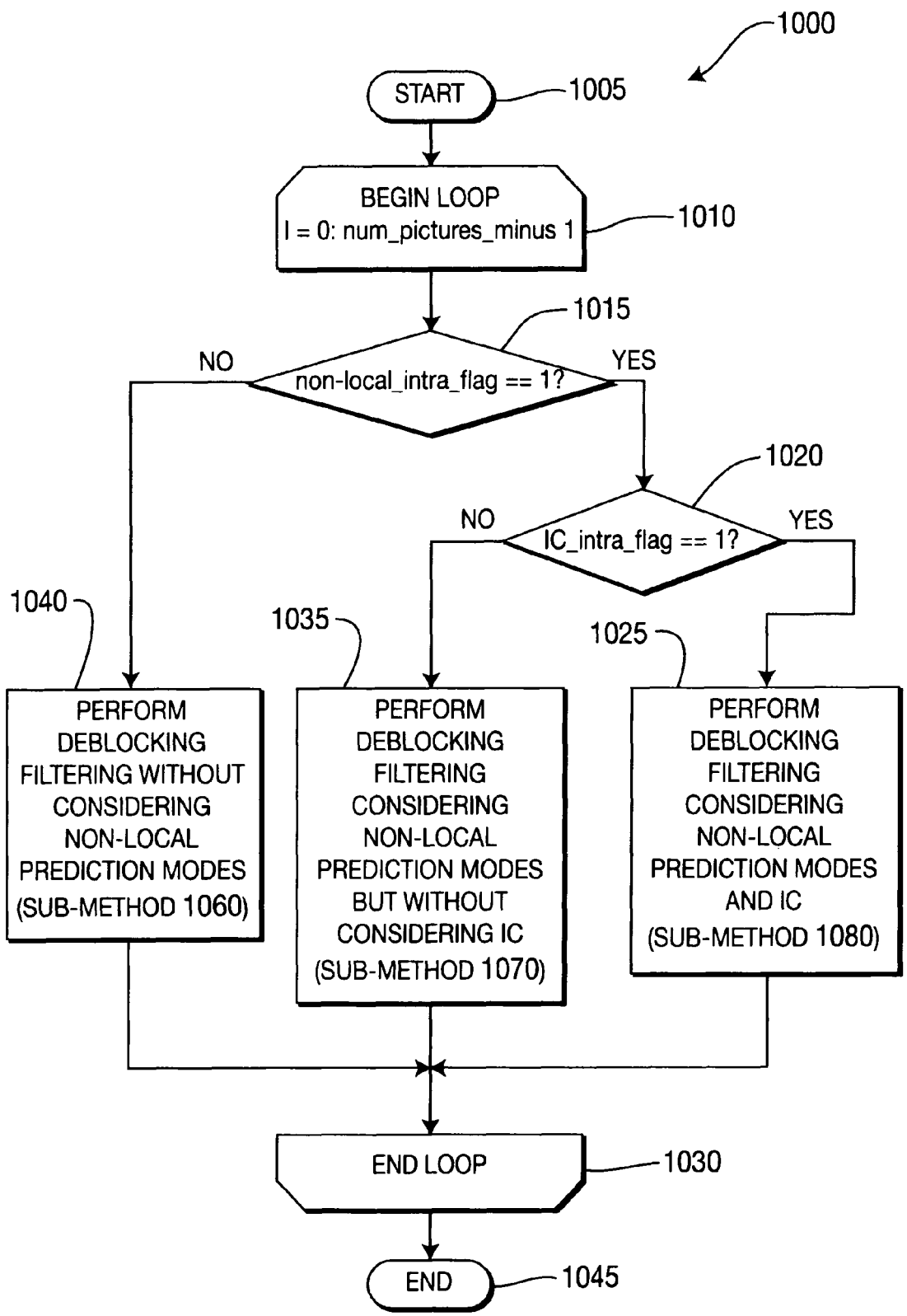
FIG. 10A is a flow diagram showing an exemplary method for deblocking filtering, in accordance with an embodiment of the present principles.

Turning to FIGS. 10A-6D, an exemplary method for deblocking filtering is indicated generally by the reference numeral 1000. The method 1000 includes sub-methods 1060, 1070, and 1080, respectively shown in FIGS. 10B, 10C, and 10D.

The method 1000 includes a start block 1005 that passes control to a loop limit block 1010. The loop limit block 1010 begins a loop over each picture in an input video sequence, using variable I with a range from 0 to num_pictures_minus1, and passes control to a decision block 1015. The decision block 1015 determines whether or not non_local_intra_flag is equal to one. If so, then control is passed to a decision block 1020. Otherwise, control is passed to a function block 1040.

The decision block 1020 determines whether or not IC_Intra_flag is equal to one. If so, then control is passed to a function block 1025. Otherwise, control is passed to a function block 1035.

The function block 1025 performs deblocking filtering that considers non-local prediction and illumination compensation using sub-method 1080 (of FIG. 10C), and passes control to a loop limit block 1030.

The loop limit block 1030 ends the loop, and passes control to an end block 1045.

The function block 1040 performs deblocking filtering that considers non-local prediction using sub-method 1060 (of FIG. 10A), and passes control to the loop limit block 1030.

The function block 1035 performs deblocking filtering that considers non-local prediction without considering illumination compensation using sub-method 1070 (of FIG. 10B), and passes control to the loop limit block 1030.

Figure 10B:
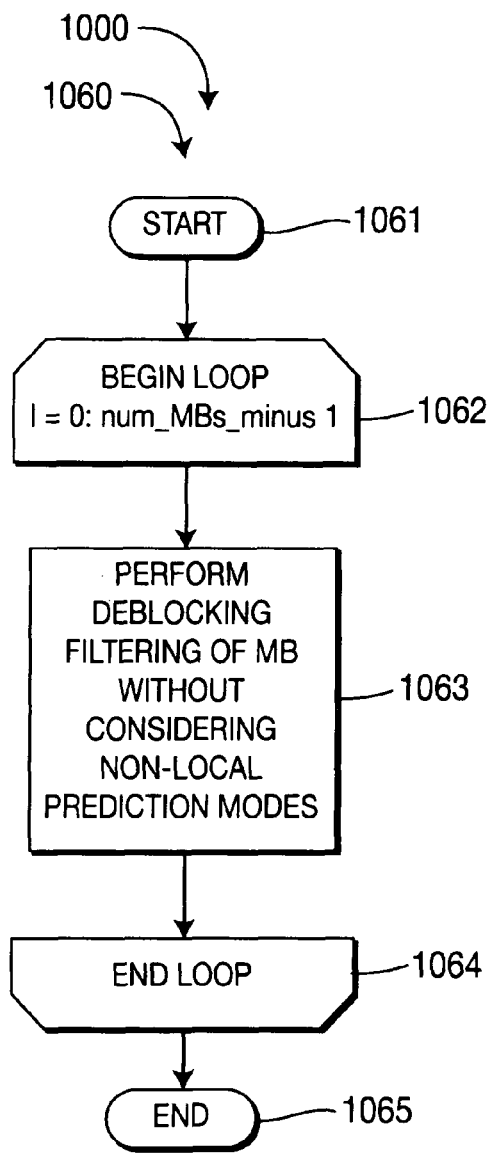
FIG. 10B is a flow diagram showing an exemplary sub-method of the method of FIG. 10A for deblocking filtering, without considering non-local prediction, in accordance with an embodiment of the present principles.

Sub-method 1060, shown in FIG. 10B, includes a start block 1061 that passes control to a loop limit block 1062. The loop limit block 1062 begins a loop over each macroblock in a current picture, using variable I with a range from 0 to num_MBs_minus1, and passes control to a function block 1063. The function block 1063 performs deblocking filtering (of a current macroblock) without considering non-local prediction, and passes control to a loop limit block 1064. The loop limit block 1064 ends the loop, and passes control to an end block 1065.

Figure 10C:
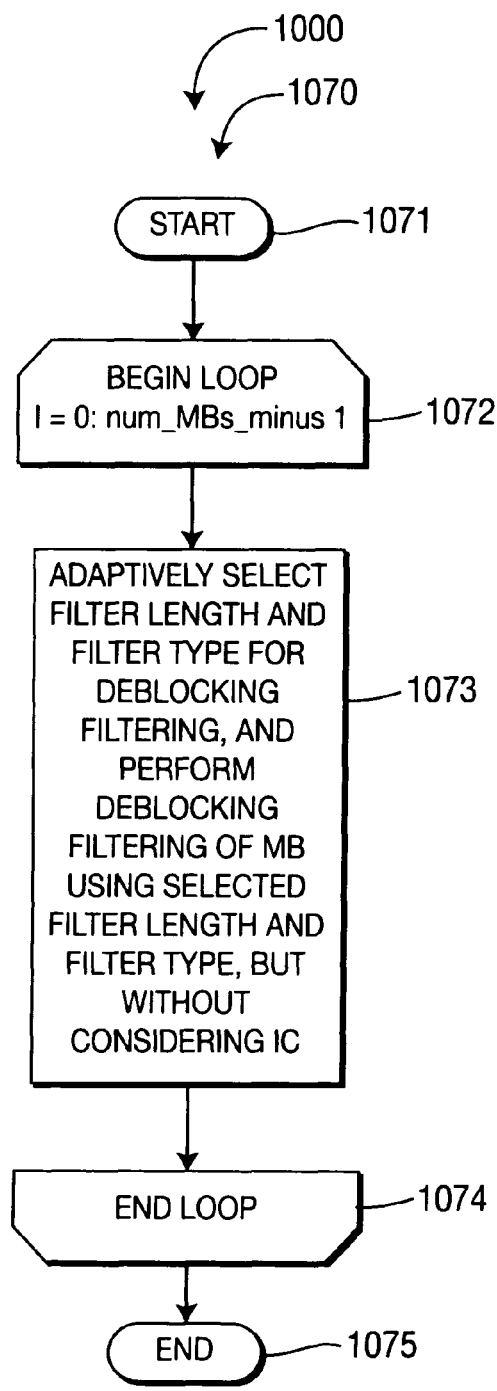
FIG. 10C is a flow diagram showing an exemplary sub-method of the method of FIG. 10A for deblocking filtering, without considering illumination compensation, in accordance with an embodiment of the present principles.

Sub-method 1070, shown in FIG. 10C, includes a start block 1071 that passes control to a loop limit block 1072. The loop limit block 1072 begins a loop over each macroblock in a current picture, using variable I with a range from 0 to num_MBs_minus1, and passes control to a function block 1073. The function block 1073 adaptively selects the filter length and filter type for deblocking filtering, performs deblocking filtering (of a current macroblock) using the selected filter length and filter type but without considering illumination compensation, and passes control to a loop limit block 1074. The loop limit block 1074 ends the loop, and passes control to an end block 1075.

Figure 10D:
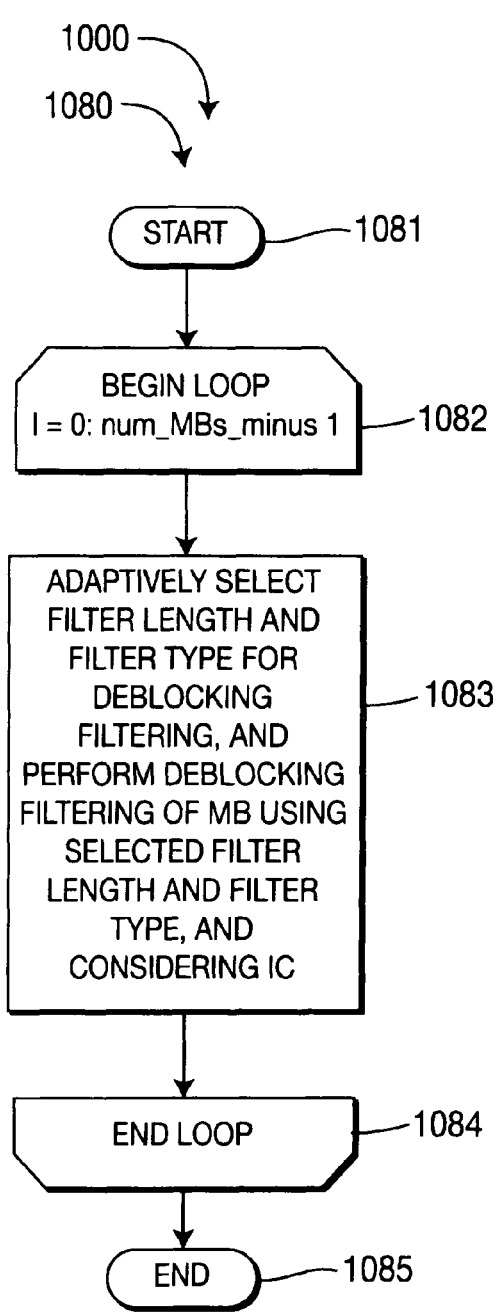
FIG. 10D is a flow diagram showing an exemplary sub-method of the method of FIG. 10A for deblocking filtering, that considers illumination compensation, in accordance with an embodiment of the present principles.

Sub-method 1080, shown in FIG. 10D, includes a start block 1081 that passes control to a loop limit block 1082. The loop limit block 1082 begins a loop over each macroblock in a current picture, using variable I with a range from 0 to num_MBs_minus1, and passes control to a function block 1083. The function block 1083 adaptively selects the filter length and filter type for deblocking filtering, performs deblocking filtering (of a current macroblock) using the selected filter length and filter type and considering illumination compensation, and passes control to a loop limit block 1084. The loop limit block 1084 ends the loop, and passes control to an end block 1085.

Figure 11A:
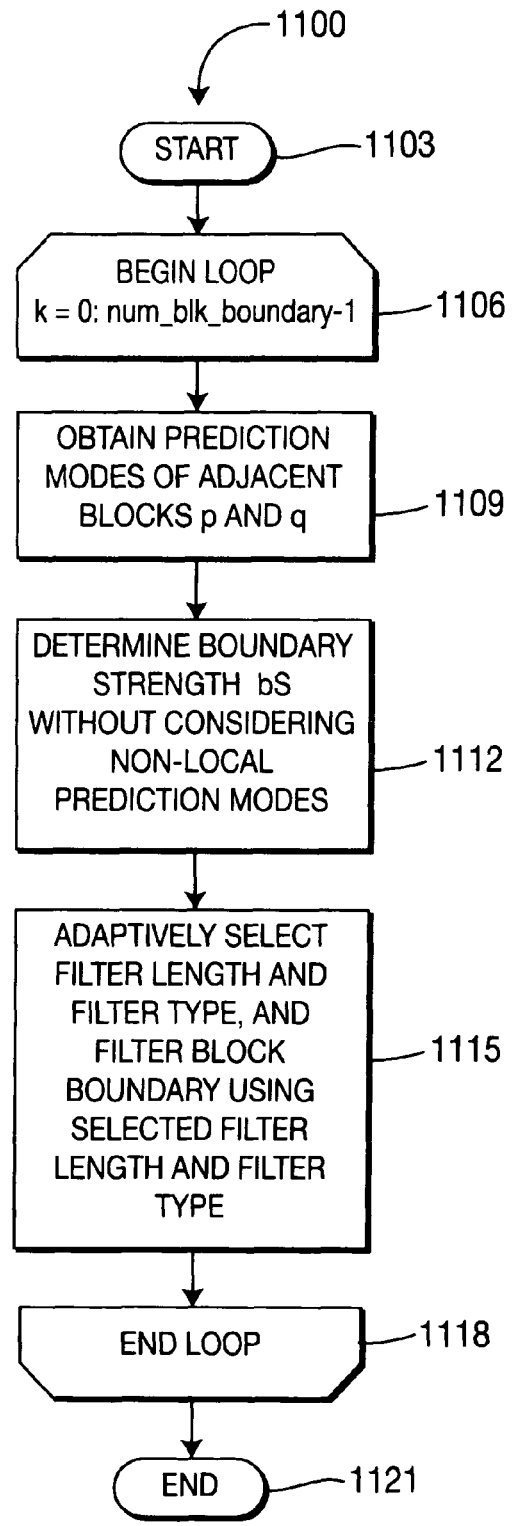
FIG. 11A is a flow diagram showing an exemplary method for deblocking filtering without considering non-local prediction, in accordance with an embodiment of the present principles.

To summarize method 1000, first we check whether non_local_intra_flag is set (i.e., it is enabled). If non_local_intra_flag is not set, then the deblocking method 1060 shown in FIG. 10B is performed. Otherwise, if non_local_ intra_ flag is set, then this represents that there are non-local predictions applied. Then, the IC_intra_flag is checked to determine whether illumination compensation is applied. If IC_intra_flag is not set (i.e., it is not enabled), then the deblocking method 1070 shown in FIG. 10C is performed. Otherwise (i.e., if IC_intra_flag is set), then deblocking method 1080 shown in FIG. 10D is performed. If neither non-local intra prediction technique nor illumination compensation is involved (i.e., deblocking method 1060 shown in FIG. 10B is performed), then the macroblock deblocking scheme shown in FIG. 11A is performed and the boundary strength is determined by following the flowchart in FIG. 3. The following two embodiments respectively describe the other two cases (sub-method 1070 or sub-method 1080 is performed), with non-local intra prediction involved (embodiment 1), and with non-local prediction and illumination compensation involved (embodiment 2).

Embodiment 1: Non-Local Intra Prediction is Involved in Intra Prediction

Figure 11B:
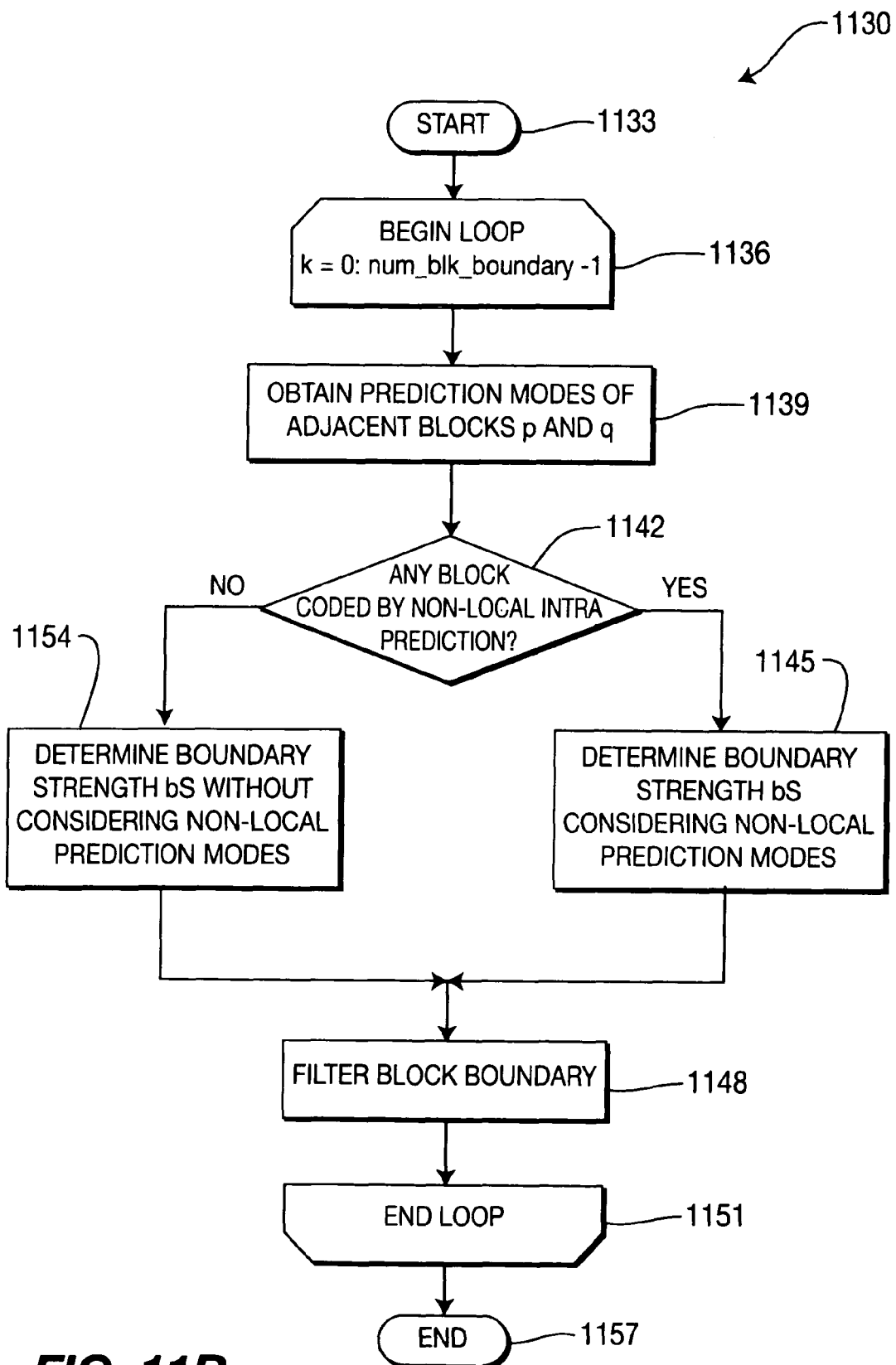
FIG. 11B, an exemplary method for deblocking filtering that considers non-local prediction, in accordance with an embodiment of the present principles.
Figure 12:
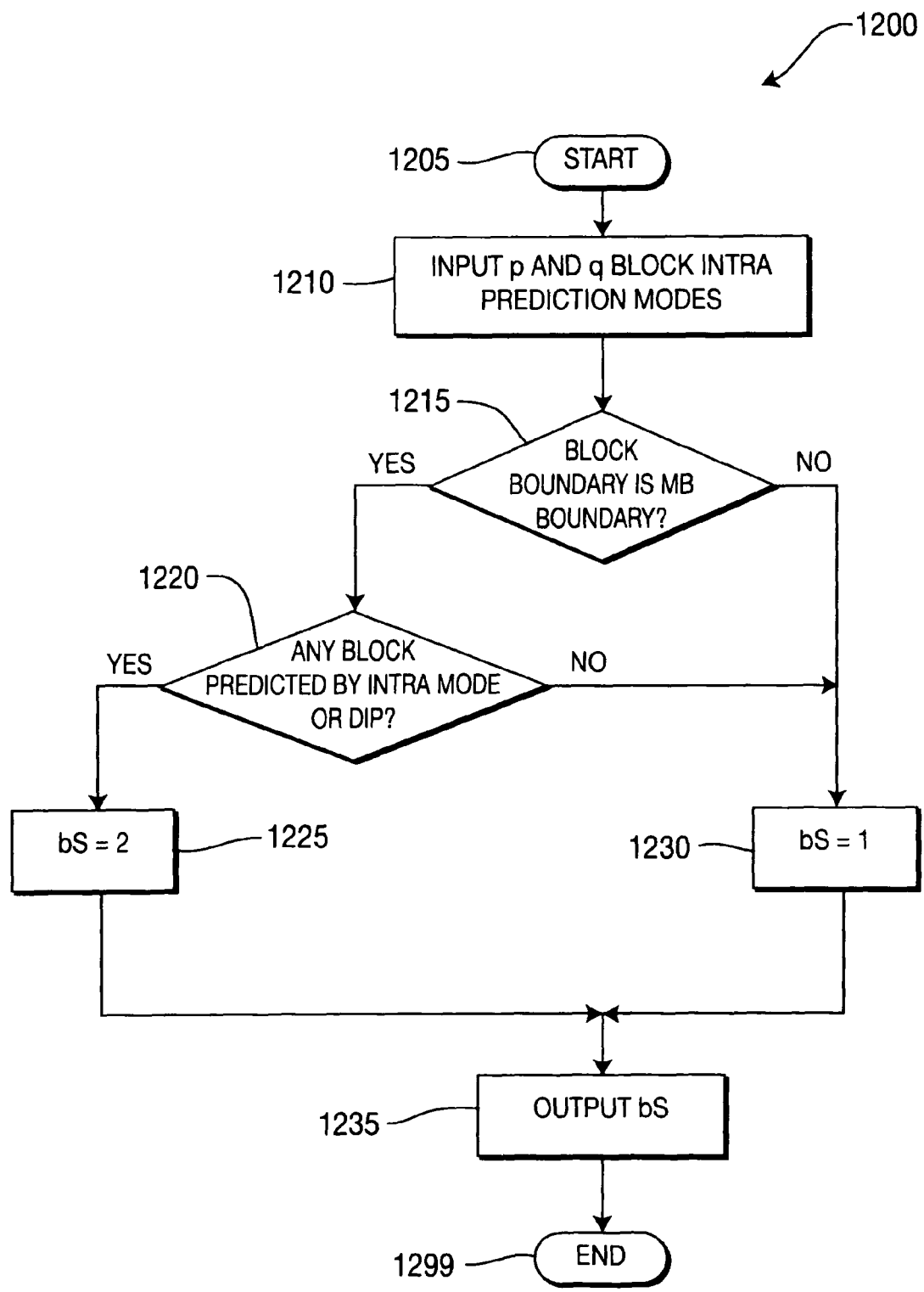
FIG. 12, an exemplary method for determining boundary strength for boundary strength filtering in consideration of non-local prediction, in accordance with an embodiment of the present principles.

In this embodiment, non-local intra prediction techniques such as, for example, displaced intra prediction and template matching prediction, are involved to predict the coding blocks. These advanced prediction techniques can reduce the residue efficiently in most cases. Thus, the deblocking filtering adaptation scheme should adapt in order to "fit" these techniques. Sub-method 1070 of FIG. 10B is taken to filter each macroblock. In this case, since illumination compensation is not involved, the method shown in FIG. 11B is performed. The horizontal and vertical boundaries of each macroblock (see, e.g., FIG. 1) are looped over. For each boundary, the prediction modes of adjacent blocks (for example, p and q) are used to determine the boundary strength bS. First, we check if there is any block in p or q predicted by a non-local prediction technique. If so (i.e., there is a block in p or q that is predicted by a non-local prediction technique), then the method 1200 shown in FIG. 12 is performed to obtain the boundary strength. Otherwise (i.e., there is no block in p or q that is predicted by a non-local prediction technique), then the method 300 of FIG. 3 is performed.

Turning to FIG. 11A, an exemplary method for deblocking filtering without considering non-local prediction is indicated generally by the reference numeral 1100. The method 1100 includes a start block 1103 that passes control to a loop limit block 1106. The loop limit block 1106 begins a loop over each block boundary in a current picture, using variable k with a range from 0 to num_blk_boundary−1, and passes control to a function block 1109. The function block 1109 obtains predictions modes of adjacent blocks p and q, and passes control to a function block 1112. The function block 1112 determines the boundary strength bS without considering any non-local prediction modes, and passes control to a function block 1115. The function block 1115 adaptively selects the filter length and filter type for deblocking filtering, filters the block boundary using the selected filter length and filter type, and passes control to a loop limit block 1118. The loop limit block 1118 ends the loop, and passes control to an end block 1121.

Turning to FIG. 11B, an exemplary method for deblocking filtering that considers non-local prediction is indicated generally by the reference numeral 1130. The method 1130 includes a start block 1133 that passes control to a loop limit block 1136. The loop limit block 1136 begins a loop over each block boundary in a current picture, using variable k with a range from 0 to num_blk_boundary−1, and passes control to a function block 1139. The function block 1139 obtain prediction modes of adjacent blocks p and q, and passes control to a decision block 1142. The decision bloc 1142 determines whether or not ay block is coded by non-local intra prediction. If so, then control is passed to a function block 1145. Otherwise, control is passed to a function block 1154.

The function block 1145 determines the boundary strength bS by considering non-local prediction modes, and passes control to a function block 1148.

The function block 1148 filters the block boundary, and passes control to a loop limit block 1151. The loop limit block 1151 ends the loop, and passes control to an end block 1157.

The function block 1154 determines the boundary strength bS without considering non-local prediction modes, and passes control to the function block 1148.

Figure 11C:
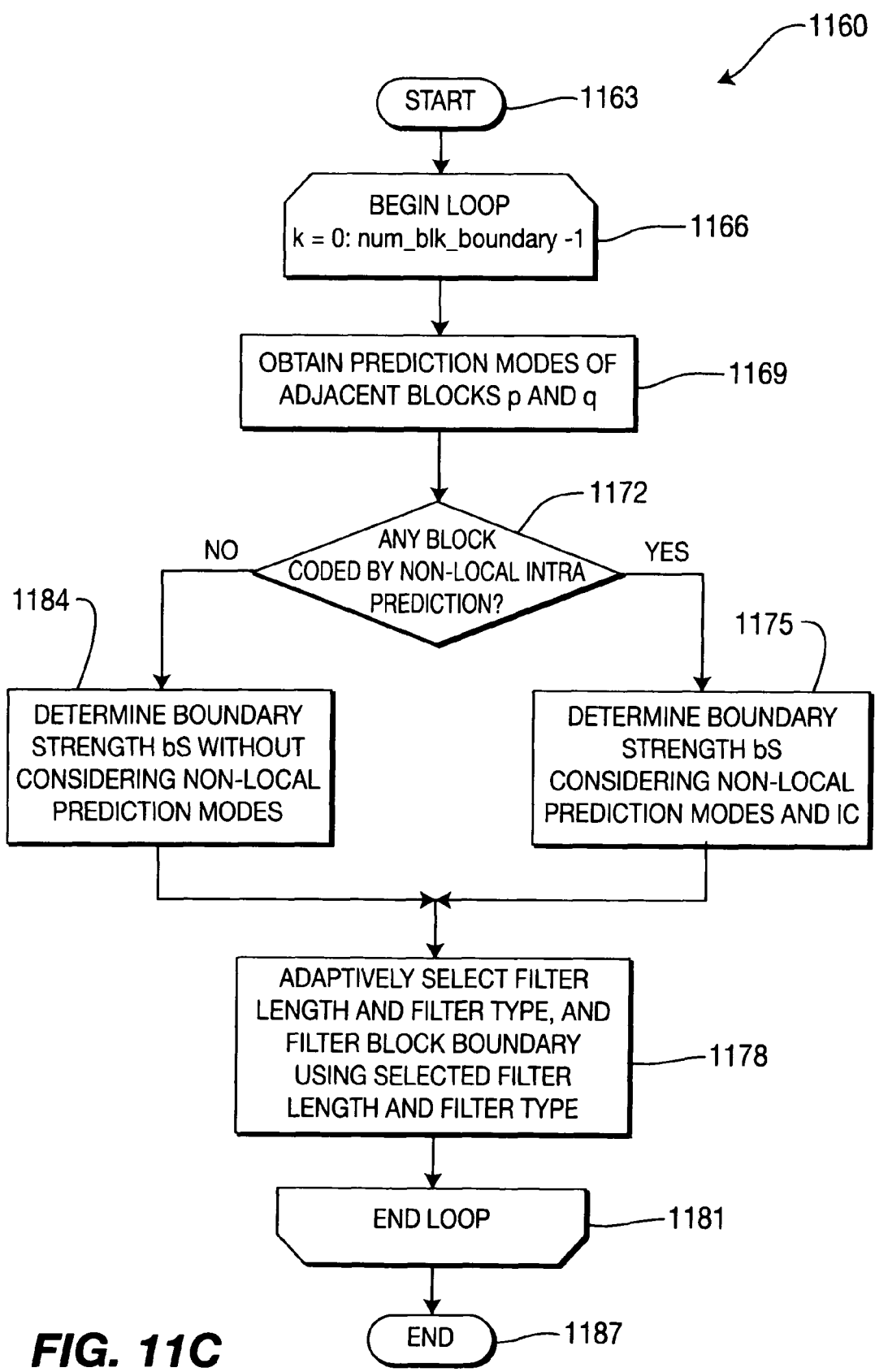
FIG. 11C, an exemplary method for deblocking filtering that considers non-local prediction and illumination compensation, in accordance with an embodiment of the present principles.

Turning to FIG. 11C, an exemplary method for deblocking filtering that considers non-local prediction and illumination compensation is indicated generally by the reference numeral 1160. The method 1160 includes a start block 1163 that passes control to a loop limit block 1166. The loop limit block 1166 begins a loop over each block boundary in a current picture, using variable k with a range from 0 to num_blk_boundary−1, and passes control to a function block 1169. The function block 1169 obtain prediction modes of adjacent blocks p and q, and passes control to a decision block 1172. The decision bloc 1172 determines whether or not ay block is coded by non-local intra prediction. If so, then control is passed to a function block 1175. Otherwise, control is passed to a function block 1184.

The function block 1175 determines the boundary strength bS by considering non-local prediction modes and illumination compensation, and passes control to a function block 1178.

The function block 1178 adaptively selects the filter length and filter type for deblocking filtering, filters the block boundary using the selected filter length and filter type, and passes control to a loop limit block 1181. The loop limit block 1181 ends the loop, and passes control to an end block 1187.

The function block 1184 determines the boundary strength bS without considering non-local prediction modes, and passes control to the function block 1178.

Turning to FIG. 12, an exemplary method for determining boundary strength for boundary strength filtering in consideration of non-local prediction is indicated generally by the reference numeral 1200. The method 1200 includes a start block 1205 that passes control to a function block 1210. The function block 1210 inputs p and q block intra prediction modes, and passes control to a decision block 1215. The decision block 1215 determines whether or not the block boundary is a macroblock boundary. If so, then control is passed to a decision block 1220. Otherwise, control is passed to a function block 1230.

The decision block 1220 determines whether or not there are any blocks predicted by an intra prediction mode or displaced intra prediction. If so, then control is passed to a function block 1225. Otherwise, control is passed to the function block 1230.

The function block 1225 sets the boundary strength bS equal to two, and passes control to a function block 1235. The function block 1235 outputs the boundary strength, and passes control to an end block 1299.

The function block 1230 sets the boundary strength bS equal to one, and passes control to the function block 1235.

Figure 13:
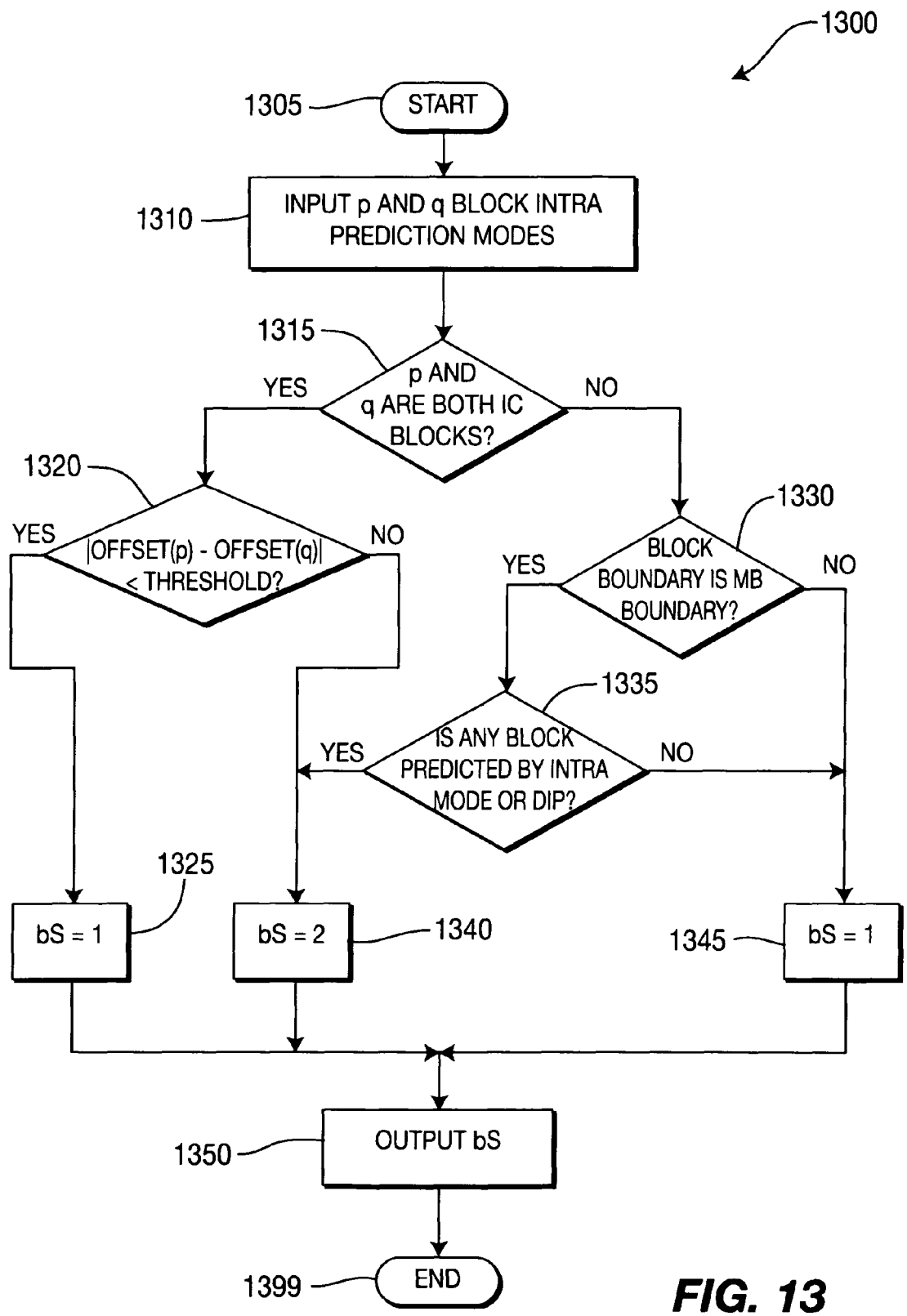
FIG. 13, an exemplary method for determining boundary strength bS with non-local prediction and illumination compensation is indicated generally by the reference numeral 1300.

Embodiment 2: Non-Local Intra Prediction and Illumination Compensation are Involved in Intra Prediction In this embodiment, non-local intra prediction techniques (such as, for example, displaced intra prediction and template matching prediction) and illumination compensation are involved to predict the coding blocks. In this embodiment, we take the illumination compensation parameters into account for the boundary strength determination. The sub-method 1080 of FIG. 10D is performed in this case. The method 1160 of FIG. 11C is performed to filter each macroblock. The horizontal and vertical boundaries of each macroblock (see, e.g., FIG. 1) are looped over. For each boundary, the prediction modes of adjacent blocks (say p and q) are used for determining the boundary strength bS. First, we check if there is any block in p or q predicted by non-local prediction techniques. If yes, then the method 1300 of FIG. 13 is performed to obtain the boundary strength bS. Otherwise, the flowchart in FIG. 3 is used to obtain the boundary strength bS. Although all illumination compensation parameters can be considered for retrieving the boundary strength bS, we only select part of them (offset) in this embodiment shown in FIG. 13 to illustrate our invention.

Turning to FIG. 13, an exemplary method for determining boundary strength bS with non-local prediction and illumination compensation is indicated generally by the reference numeral 1300.

The method 1300 includes a start block 1305 that passes control to a function block 1310. The function block 1310 inputs p and q block intra prediction modes, and passes control to a decision block 1315. The decision block 1315 determines whether or not p and q are both illumination compensated blocks. If so, then control is passed to a decision block 1320. Otherwise, control is passed to a decision block 1330.

The decision block 1320 determines whether or not |offset(p)−offset(q)|<threshold. If so, then control is passed to a function block 1325. Otherwise, control is passed to a function block 1340.

The function block 1325 sets the boundary strength bS equal to one, and passes control to a function block 1350.

The function block 1350 outputs the boundary strength bS, and passes control to an end block 1399.

The function block 1340 sets the boundary strength bS equal to two, and passes control to the function block 1350.

The decision block 1330 determines whether or not the block boundary is a macroblock boundary. If so, then control is passed to a decision block 1335. Otherwise, control is passed to a function block 1345.

The decision block 1335 determines whether or not there is any block predicted by an intra prediction mode or displaced intra prediction. If so, then control is passed to the function block 1340. Otherwise, control is passed to a function block 1345.

The function block 1345 sets the boundary strength bS equal to one, and passes control to the function block 1350.

A description will now be given of some of the many attendant advantages/features of the present invention, some of which have been mentioned above. For example, one advantage/feature is an apparatus having an encoder for encoding picture data using non-local intra prediction. The encoder includes a deblocking filter configured for use with non-local intra prediction modes so as to deblock filter at least a portion of the picture data encoded using the non-local intra prediction.

Another advantage/feature is the apparatus having the encoder as described above, wherein a deblocking filter strength is adaptively selected based upon at least one of a scanning order of the picture data, coding mode information, intra displacement information, and illumination compensation parameters of adjacent picture data regions.

Yet another advantage/feature is the apparatus having the encoder as described above, wherein a deblocking filter type is adaptively selected.

Still another advantage/feature is the apparatus having the encoder wherein a deblocking filter type is adaptively selected as described above, wherein the deblocking filter type is adaptively selected based upon at least one of coding parameters and reconstructed picture data characteristics.

Moreover, another advantage/feature is the apparatus having the encoder as described above, wherein a deblocking filter length is adaptively selected.

Further, another advantage/feature is the apparatus having the encoder wherein a deblocking filter length is adaptively selected as described above, wherein the deblocking filter length is adaptively selected based upon illumination compensation parameters of adjacent picture data regions.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder operating on picture data using non-local intra prediction that uses pixel values located beyond local neighboring data within a reconstructed portion of the picture, and, wherein said encoder is configured to:
determine whether to code a portion of a picture using non-local intra prediction and illumination compensation;
if non-local intra prediction is being used, obtaining prediction modes of adjacent blocks for each boundary of a current block being encoded, determining the boundary strength for the boundary of said current block by using non-local prediction modes of the adjacent blocks, adaptively selecting deblocking filter length and deblocking filter type, and encoding the portion of the picture by using non-local intra prediction from reconstructed data of the picture; and deblocking filtering at least a portion of the encoded and reconstructed picture data by using the selected filter length and filter type without considering illumination compensation;
if non-local intra prediction and illumination compensation are being used, obtaining prediction modes of adjacent blocks for each boundary of a current block being encoded, calculating boundary strength for the boundary of said current block based on non-local prediction modes of said adjacent blocks and on illumination compensation, adaptively selecting deblocking filter length based upon illumination compensation parameters of the adjacent blocks and adaptively selecting deblocking filter type based upon at least one of coding parameters and reconstructed picture data characteristics, and encoding the portion of the picture by using non-local intra prediction from reconstructed data of the picture; and deblocking filtering at least a portion of the encoded picture data by using the selected filter length and filter type and considering illumination compensation.

2. The apparatus of claim 1, wherein a deblocking filter strength is adaptively selected based upon at least one of a scanning order of the picture data, coding mode information, intra displacement information, and illumination compensation parameters of adjacent picture data regions.

3. A method, comprising:
determining whether to code a portion of a picture using non-local intra prediction and illumination compensation;
if non-local intra prediction is being used, obtaining prediction modes of adjacent blocks for each boundary of a current block being encoded, determining the boundary strength for the boundary of said current block by using non-local prediction modes of the adjacent blocks, adaptively selecting deblocking filter length and deblocking filter type, and encoding the portion of the picture by using non-local intra prediction from reconstructed data of the picture; and deblocking filtering at least a portion of the encoded picture data by using the selected filter length and filter type without considering illumination compensation;
if non-local intra prediction and illumination compensation are being used, obtaining prediction modes of adjacent blocks for each boundary of a current block being encoded, calculating boundary strength for the boundary of said current block based on non-local prediction modes of said adjacent blocks and on illumination compensation, adaptively selecting deblocking filter length based upon illumination compensation parameters of the adjacent blocks and adaptively selecting deblocking filter type based upon at least one of coding parameters and reconstructed picture data characteristics, and encoding the portion of the picture by using non-local intra prediction from reconstructed data of the picture; and deblocking filtering at least a portion of the encoded picture data by using the selected filter length and filter type and considering illumination compensation.

4. The method of claim 3, wherein a deblocking filter strength is adaptively selected based upon at least one of a scanning order of the picture data, coding mode information, intra displacement information, and illumination compensation parameters of adjacent picture data regions.

5. An apparatus, comprising:
a decoder operating on picture data using non-local intra prediction that uses pixel values located beyond local neighboring data within a decoded portion of the picture, and, wherein said decoder is configured to:
determine whether to decode a portion of a picture using non-local intra prediction and illumination compensation;
if non-local intra prediction is being used, obtaining prediction modes of adjacent blocks for each boundary of a current block being decoded, determining the boundary strength for the boundary of said current block by using non-local prediction modes of the adjacent blocks, adaptively selecting deblocking filter length and deblocking filter type, and decoding the portion of the picture by using non-local intra prediction from reconstructed data of the picture; and deblocking filtering at least a portion of the decoded picture data by using the selected filter length and filter type without considering illumination compensation;
if non-local intra prediction and illumination compensation are being used, obtaining prediction modes of adjacent blocks for each boundary of a current block being decoded calculating boundary strength for the boundary of said current block based on non-local prediction modes of said adjacent blocks and on illumination compensation, adaptively selecting deblocking filter length based upon illumination compensation parameters of the adjacent blocks and adaptively selecting deblocking filter type based upon at least one of coding parameters and reconstructed picture data characteristics, and decoding the portion of the picture by using non-local intra prediction from reconstructed data of the picture; and deblocking filtering at least a portion of the decoded picture data by using the selected filter length and filter type and considering illumination compensation.

6. The apparatus of claim 5, wherein a deblocking filter strength is adaptively selected based upon at least one of a scanning order of the picture data, coding mode information, intra displacement information, and illumination compensation parameters of adjacent picture data regions.

7. A method, comprising:
   determining whether to decode a portion of a picture using non-local intra prediction and illumination compensation;
   if non-local intra prediction is being used, obtaining prediction modes of adjacent blocks for each boundary of a current block being decoded, determining the boundary strength for the boundary of said current block by using non-local prediction modes of the adjacent blocks, adaptively selecting deblocking filter length and deblocking filter type, and decoding the portion of the picture by using non-local intra prediction from reconstructed data of the picture; and deblocking filtering at least a portion of the decoded picture data by using the selected filter length and filter type without considering illumination compensation;
   if non-local intra prediction and illumination compensation are being used, obtaining prediction modes of adjacent blocks for each boundary of a current block being decoded calculating boundary strength for the boundary of said current block based on non-local prediction modes of said adjacent blocks and on illumination compensation, adaptively selecting deblocking filter length based upon illumination compensation parameters of the adjacent blocks and adaptively selecting deblocking filter type based upon at least one of coding parameters and reconstructed picture data characteristics, and decoding the portion of the picture by using non-local intra prediction from reconstructed data of the picture; and deblocking filtering at least a portion of the decoded picture data by using the selected filter length and filter type and considering illumination compensation.

8. The method of claim 7, wherein a deblocking filter strength is adaptively selected based upon at least one of a scanning order of the picture data, coding mode information, intra displacement information, and illumination compensation parameters of adjacent picture data regions.

* * * * *